US010582397B2

(12) United States Patent
Sun et al.

(10) Patent No.: US 10,582,397 B2
(45) Date of Patent: Mar. 3, 2020

(54) BEAM REFINEMENT REFERENCE SIGNAL TRANSMISSIONS DURING CONTROL SYMBOL

(71) Applicant: QUALCOMM Incorporated, San Diego, CA (US)

(72) Inventors: Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 15/694,479

(22) Filed: Sep. 1, 2017

(65) Prior Publication Data

US 2018/0132114 A1    May 10, 2018

Related U.S. Application Data

(60) Provisional application No. 62/419,770, filed on Nov. 9, 2016.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04B 7/088* (2013.01);
(Continued)

(58) Field of Classification Search
CPC .... H04B 17/24; H04B 7/0617; H04B 7/0621; H04B 7/0639; H04B 7/0684;
(Continued)

(56) References Cited

U.S. PATENT DOCUMENTS 8,203,987 B2 * 6/2012 Ishii .................... H04W 52/367
370/311
8,279,839 B2 * 10/2012 Brunel ................. H04B 7/2656
370/336
(Continued)

FOREIGN PATENT DOCUMENTS

WO    WO2016099360 A1    6/2016

OTHER PUBLICATIONS

Ericsson: "Verizon 5G TF, Air Interface Working Group, Verizon 5th Generation Radio Access, Physical channels and modulation (Release 1)", TS V5G.211 V1.3 (Jun. 2016), pp. 1-79.
(Continued)

*Primary Examiner* — Dung B Huynh
(74) *Attorney, Agent, or Firm* — Holland & Hart LLP/Qualcomm

(57) ABSTRACT

Techniques are described herein to transmit beam refinement reference signals and control information in a control symbol. The beam refinement reference signals may occupy frequency resources different from those occupied by the control information. During a beam refinement procedure, a transmitting entity may generate a plurality of directional beams. Multiple beam refinement reference signals may be generated for a single directional beam. Beam refinement reference signals for each directional beam may be distributed throughout various frequency resources of the control symbol. A receiving entity may measure at least one parameter of the beam refinement reference signals and select a preferred beam refinement reference signal. The transmitting entity may adjust characteristics of a current directional beam of a communication link between the transmitting entity and the receiving entity based on the preferred beam refinement reference signal.

30 Claims, 21 Drawing Sheets

US 10,582,397 B2

Page 2

(51) Int. Cl.
*H04L 5/00* (2006.01)
*H04B 7/08* (2006.01)
*H04W 72/04* (2009.01)
*H04B 17/24* (2015.01)

(52) U.S. Cl.
CPC .......... *H04L 5/0048* (2013.01); *H04L 5/0053* (2013.01); *H04W 72/0406* (2013.01); *H04B 7/0617* (2013.01); *H04B 7/0621* (2013.01); *H04B 7/0639* (2013.01); *H04B 7/0684* (2013.01); *H04B 7/0837* (2013.01); *H04B 17/24* (2015.01); *H04W 72/046* (2013.01); *H04W 72/0453* (2013.01); *H04W 72/0473* (2013.01)

(58) Field of Classification Search
CPC .... H04B 7/0695; H04B 7/0837; H04B 7/088; H04B 7/0408; H04B 7/0626; H04B 7/063; H04B 7/0632; H04L 5/0048; H04L 5/0053; H04W 16/28; H04W 72/0406; H04W 72/0453; H04W 72/046; H04W 72/0473; H04W 24/10; H04W 72/1226
See application file for complete search history.

(56) References Cited

U.S. PATENT DOCUMENTS

| Patent/Pub. No. | | Date | Inventor | Class |
|---|---|---|---|---|
| 8,559,351 | B2 * | 10/2013 | Hou | H04B 7/024 370/312 |
| 9,184,511 | B2 | 11/2015 | Ma et al. | |
| 9,538,521 | B2 * | 1/2017 | Papasakellariou | H04W 72/042 |
| 10,063,304 | B2 * | 8/2018 | Frenne | H04B 7/0626 |
| 10,305,561 | B2 * | 5/2019 | Baek | H04B 7/0617 |
| 2010/0091724 | A1 * | 4/2010 | Ishii | H04W 52/32 370/329 |
| 2010/0157895 | A1 * | 6/2010 | Pani | H04W 52/346 370/328 |
| 2010/0296470 | A1 * | 11/2010 | Heo | H04W 52/365 370/329 |
| 2011/0188438 | A1 * | 8/2011 | Lee | H04B 7/0413 370/312 |
| 2012/0275400 | A1 * | 11/2012 | Chen | H04J 11/0033 370/329 |
| 2013/0003663 | A1 * | 1/2013 | Blankenship | H04L 1/0004 370/329 |
| 2013/0017836 | A1 * | 1/2013 | Chang | H01Q 1/1257 455/452.1 |
| 2013/0040684 | A1 * | 2/2013 | Yu | H04B 7/0617 455/517 |
| 2013/0040688 | A1 * | 2/2013 | Mizusawa | H04W 52/367 455/522 |
| 2013/0044727 | A1 * | 2/2013 | Nory | H04L 5/0092 370/330 |
| 2013/0057432 | A1 * | 3/2013 | Rajagopal | H01Q 3/26 342/368 |
| 2013/0058315 | A1 * | 3/2013 | Feuersanger | H04W 52/281 370/336 |
| 2013/0064190 | A1 * | 3/2013 | Hariharan | H04L 5/0053 370/329 |
| 2013/0083774 | A1 * | 4/2013 | Son | H04W 36/0055 370/331 |
| 2013/0102345 | A1 * | 4/2013 | Jung | H04B 7/0456 455/513 |
| 2013/0156120 | A1 * | 6/2013 | Josiam | H04B 7/0697 375/260 |
| 2013/0178220 | A1 * | 7/2013 | Lee | H04L 5/0007 455/450 |
| 2013/0188589 | A1 * | 7/2013 | Nakashima | H04B 7/0404 370/329 |
| 2013/0258972 | A1 * | 10/2013 | Kim | H04B 7/0617 370/329 |
| 2013/0272229 | A1 * | 10/2013 | Dinan | H04W 52/18 370/329 |
| 2013/0286960 | A1 * | 10/2013 | Li | H04W 72/042 370/329 |
| 2013/0301454 | A1 * | 11/2013 | Seol | H04B 7/043 370/252 |
| 2013/0329662 | A1 * | 12/2013 | Chen | H04W 72/0473 370/329 |
| 2014/0044044 | A1 * | 2/2014 | Josiam | H04W 24/10 370/328 |
| 2014/0050191 | A1 * | 2/2014 | Kim | H04L 5/001 370/329 |
| 2014/0050280 | A1 * | 2/2014 | Stirling-Gallacher | H04B 7/0486 375/296 |
| 2014/0064158 | A1 * | 3/2014 | Timus | H04W 36/30 370/279 |
| 2014/0073337 | A1 * | 3/2014 | Hong | H04W 16/28 455/452.1 |
| 2014/0086201 | A1 * | 3/2014 | Nagata | H04W 72/1289 370/330 |
| 2014/0105141 | A1 * | 4/2014 | Noh | H04W 52/04 370/329 |
| 2014/0112253 | A1 * | 4/2014 | Nagata | H04L 5/0023 370/328 |
| 2014/0133449 | A1 * | 5/2014 | Xu | H04W 52/367 370/329 |
| 2014/0169328 | A1 * | 6/2014 | Ahimezawa | H04B 7/0452 370/330 |
| 2014/0177607 | A1 * | 6/2014 | Li | H04B 7/0617 370/336 |
| 2014/0185481 | A1 * | 7/2014 | Seol | H04W 52/42 370/252 |
| 2014/0293890 | A1 * | 10/2014 | Davydov | H04L 5/0085 370/329 |
| 2014/0293944 | A1 * | 10/2014 | Kim | H04W 72/042 370/329 |
| 2014/0323144 | A1 * | 10/2014 | Kim | H04B 7/0617 455/452.1 |
| 2014/0348125 | A1 * | 11/2014 | Zhao | H04W 72/02 370/330 |
| 2015/0110031 | A1 * | 4/2015 | Takeda | H04W 72/042 370/329 |
| 2015/0162966 | A1 * | 6/2015 | Kim | H04B 17/00 370/252 |
| 2015/0222402 | A1 * | 8/2015 | Ouchi | H04L 1/00 370/329 |
| 2015/0236774 | A1 * | 8/2015 | Son | H04B 7/0628 375/267 |
| 2015/0295688 | A1 * | 10/2015 | Pan | H04B 7/0667 370/329 |
| 2015/0341105 | A1 * | 11/2015 | Yu | H04B 7/088 370/328 |
| 2015/0341949 | A1 * | 11/2015 | Nagata | H04L 5/0098 370/329 |
| 2015/0358064 | A1 * | 12/2015 | Benjebbour | H04B 7/0452 370/329 |
| 2016/0007371 | A1 * | 1/2016 | Pietraski | H04W 72/1263 370/315 |
| 2016/0020876 | A1 * | 1/2016 | Raghavan | H04W 76/10 370/252 |
| 2016/0044706 | A1 * | 2/2016 | Yang | H04L 5/005 370/329 |
| 2016/0087706 | A1 * | 3/2016 | Guey | H04L 27/2607 375/267 |
| 2016/0119910 | A1 * | 4/2016 | Krzymien | H04B 7/0639 370/329 |
| 2016/0134352 | A1 * | 5/2016 | Stirling-Gallacher | H04B 7/0639 370/329 |
| 2016/0183228 | A1 * | 6/2016 | Song | H04L 5/0048 370/330 |
| 2016/0192385 | A1 * | 6/2016 | Tooher | H04L 5/0051 370/336 |
| 2016/0205632 | A1 * | 7/2016 | Yi | H04W 52/146 455/522 |

(56) References Cited

U.S. PATENT DOCUMENTS

| | | | |
|---|---|---|---|
| 2016/0241323 A1* | 8/2016 | Ko | H04B 7/0691 |
| 2016/0255593 A1* | 9/2016 | Blankenship | H04W 52/146 |
| | | | 370/328 |
| 2016/0270038 A1* | 9/2016 | Papasakellariou | H04W 72/042 |
| 2016/0285660 A1* | 9/2016 | Frenne | H04L 27/261 |
| 2016/0295525 A1* | 10/2016 | Zhu | H04B 7/0617 |
| 2016/0301556 A1* | 10/2016 | Nory | H04L 5/0053 |
| 2016/0337916 A1* | 11/2016 | Deenoo | H04W 8/22 |
| 2016/0344463 A1* | 11/2016 | Kim | H04B 7/0456 |
| 2016/0374060 A1* | 12/2016 | Lim | H04L 5/0048 |
| 2017/0013565 A1* | 1/2017 | Pelletier | H04W 52/146 |
| 2017/0026938 A1* | 1/2017 | Onggosanusi | H04B 7/0626 |
| 2017/0033856 A1 | 2/2017 | Su et al. | |
| 2017/0041103 A1* | 2/2017 | Maattanen | H04L 1/1671 |
| 2017/0078983 A1* | 3/2017 | Ahn | H04W 52/34 |
| 2017/0142666 A1* | 5/2017 | Shimezawa | H04W 16/32 |
| 2017/0163388 A1* | 6/2017 | Wiemann | H04L 1/1851 |
| 2017/0164410 A1* | 6/2017 | Takeda | H04W 28/16 |
| 2017/0195976 A1* | 7/2017 | Goto | H04W 52/44 |
| 2017/0207843 A1* | 7/2017 | Jung | H04B 7/0408 |
| 2017/0207845 A1* | 7/2017 | Moon | H04B 7/088 |
| 2017/0208494 A1* | 7/2017 | Moon | H04W 24/10 |
| 2017/0214559 A1* | 7/2017 | Berardinelli | H04L 27/2602 |
| 2017/0215107 A1* | 7/2017 | Kakishima | H04W 52/32 |
| 2017/0222693 A1* | 8/2017 | Shen | H04B 7/0408 |
| 2017/0288743 A1* | 10/2017 | Nam | H04B 7/024 |
| 2017/0288763 A1* | 10/2017 | Yoo | H01Q 3/10 |
| 2017/0302341 A1* | 10/2017 | Yu | H04B 7/0639 |
| 2017/0302414 A1* | 10/2017 | Islam | H04L 5/0048 |
| 2017/0303263 A1* | 10/2017 | Islam | H04B 7/0408 |
| 2017/0310427 A1* | 10/2017 | Wakabayashi | H04L 1/1825 |
| 2017/0310447 A1* | 10/2017 | Kusashima | H04J 11/00 |
| 2017/0331577 A1* | 11/2017 | Parkvall | H04J 11/0079 |
| 2017/0332359 A1* | 11/2017 | Tsai | H04B 7/0617 |
| 2017/0347270 A1* | 11/2017 | Iouchi | H04W 16/14 |
| 2017/0353947 A1* | 12/2017 | Ang | H04B 7/0413 |
| 2017/0366992 A1* | 12/2017 | Rune | H04L 5/0016 |
| 2017/0367114 A1* | 12/2017 | Ahn | H04L 5/0048 |
| 2018/0019843 A1* | 1/2018 | Papasakellariou | H04L 1/1822 |
| 2018/0027594 A1* | 1/2018 | Nagaraja | H04B 7/0695 |
| | | | 370/329 |
| 2018/0034531 A1* | 2/2018 | Sadiq | H04B 7/0408 |
| 2018/0041319 A1* | 2/2018 | Cheng | H04L 5/0048 |
| 2018/0048375 A1* | 2/2018 | Guo | H04B 7/088 |
| 2018/0049055 A1* | 2/2018 | Wiberg | H04B 7/0695 |
| 2018/0062722 A1* | 3/2018 | Su | H04B 7/06 |
| 2018/0063868 A1* | 3/2018 | Abedini | H04B 17/24 |
| 2018/0083680 A1* | 3/2018 | Guo | H04B 7/0617 |
| 2018/0083758 A1* | 3/2018 | Islam | H04L 5/0083 |
| 2018/0084593 A1* | 3/2018 | Chen | H04W 76/11 |
| 2018/0092087 A1* | 3/2018 | Zirwas | H04B 7/0413 |
| 2018/0092129 A1* | 3/2018 | Guo | H04L 5/0048 |
| 2018/0098337 A1* | 4/2018 | Lee | H04W 72/042 |
| 2018/0102882 A1* | 4/2018 | Nakamura | H04J 11/00 |
| 2018/0109304 A1* | 4/2018 | Wiberg | H04B 7/0617 |
| 2018/0124755 A1* | 5/2018 | Huang | H04W 72/0413 |
| 2018/0131426 A1* | 5/2018 | Lee | H04B 7/0456 |
| 2018/0132217 A1* | 5/2018 | Stirling-Gallacher | H04B 7/0417 |
| 2018/0159603 A1* | 6/2018 | Kim | H04B 7/0617 |
| 2018/0183505 A1* | 6/2018 | Kim | H04B 7/0695 |
| 2018/0206253 A1* | 7/2018 | Yun | H04L 5/0062 |
| 2018/0213548 A1* | 7/2018 | Li | H04W 16/10 |
| 2018/0227886 A1* | 8/2018 | Chou | H04W 72/046 |
| 2018/0242264 A1* | 8/2018 | Pelletier | H04W 52/146 |
| 2018/0254853 A1* | 9/2018 | Jung | H04L 1/0038 |
| 2018/0255543 A1* | 9/2018 | Takeda | H04B 1/713 |
| 2018/0294859 A1* | 10/2018 | Niu | H04J 11/00 |
| 2018/0309539 A1* | 10/2018 | Tang | H04L 1/0013 |
| 2018/0310283 A1* | 10/2018 | Deenoo | H04W 72/042 |
| 2018/0317092 A1* | 11/2018 | Harada | H04L 5/0048 |
| 2019/0007116 A1* | 1/2019 | Chang | H04B 7/0684 |
| 2019/0044584 A1* | 2/2019 | Lee | H04B 7/0417 |
| 2019/0044601 A1* | 2/2019 | Chang | H04W 36/0022 |
| 2019/0052331 A1* | 2/2019 | Chang | H04B 7/0626 |
| 2019/0058558 A1* | 2/2019 | Lee | H04W 56/001 |
| 2019/0089446 A1* | 3/2019 | Zhang | H04L 5/0048 |
| 2019/0123864 A1* | 4/2019 | Zhang | H04B 7/088 |
| 2019/0166610 A1* | 5/2019 | Lee | H04W 72/04 |
| 2019/0173562 A1* | 6/2019 | Yu | H04B 7/0617 |
| 2019/0191453 A1* | 6/2019 | Xiong | H04W 72/0406 |
| 2019/0229789 A1* | 7/2019 | Zhang | H04B 7/0617 |
| 2019/0253115 A1* | 8/2019 | Park | H04B 7/0626 |

OTHER PUBLICATIONS

Cisco., et al., "Verizon 5G TF; Air Interface Working Group; Verizon 5th Generation Radio Access; Physical Layer procedures (Release 1)," Jun. 29, 2016, pp. 1-43, XP055318107, Retrieved from the Internet: URL:http://www.5gtf.org/V5G_213_v1p0.pdf [retrieved on Nov. 10, 2016].

Intel Corporation: "Reference Signal and Procedure for UE Beam Refinement (BM P-3)", 3GPP Draft; R1-1609514, vol. RAN WG1, No. Lisbon, Portugal; Oct. 9, 2016, XP051149553, Retrieved from the Internet: URL:http://www.3gpp.org/ftp/Meetings_3GPP_SYNC/RAN1/Docs/ [retrieved on Oct. 9, 2016], 4 pages.

International Search Report and Written Opinion—PCT/US2017/050006—ISA/EPO—dated Jan. 3, 2018.

Samsung; "Multiplexing of Synchronization Signals and System Information Delivery Channels for below 6 GHz and above 6 GHz", 3GPP Draft; R1-1609111, vol. Ran WG1, No. Lisbon, Portugal; Oct. 9, 2016, XP051149160, Retrieved from the Internet: URL:http://www.3gpp.org/ftp/Meetings_3GPP_SYNC/RAN1/Docs/ [retrieved on Oct. 9, 2016], 6 pages.

ZTE Corporation et al., "Reference Signal Design for NR MIMO", 3GPP Draft; R1-166213 Reference Signal Design for NR MIMO FINAL, 3rd Generation Partnership Project (3GPP), Mobile Competence Centre; 650, Route Des Lucioles ; F-06921 Sophia-Antipolis Cedex; France vol. RAN WG1, No. Gothenburg. Sweden; Aug. 22, 2016-Aug. 26, 2016 Aug. 21, 2016 (Aug. 21, 2016), XP051125265, 6 pages, Retrieved from the Internet: URL:http://www.3gpp.org/ftp/Meetings_3GPPSYNC/RAN1/DOCS/— [retrieved on Aug. 21, 2016].

* cited by examiner

BEAM REFINEMENT REFERENCE SIGNAL TRANSMISSIONS DURING CONTROL SYMBOL

CROSS REFERENCES

The present application for patent claims priority to U.S. Provisional Patent Application No. 62/419,770 by Sun, et al., entitled "Beam Refinement Reference Signal Transmissions During Control Symbol," filed Nov. 9, 2016, assigned to the assignee hereof, and which is expressly incorporated by reference herein in its entirety.

BACKGROUND

The following relates generally to wireless communication, and more specifically to transmitting beam refinement reference signals during a control symbol.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communication systems, directional beams may be used to communicate information from a transmitting entity (e.g., a base station) to a receiving entity (e.g., a UE). These directional beams may be formed with various techniques and may be based on received or transmitted information.

SUMMARY

The described techniques relate to improved methods, systems, devices, or apparatuses that support transmitting beam refinement reference signals during a control symbol. Generally, the described techniques provide for transmitting beam refinement reference signals and control information in a control symbol. The beam refinement reference signals may occupy some frequency resources different from those occupied by control information. During a beam refinement procedure, a transmitting entity may generate a plurality of directional beams. Multiple beam refinement reference signals may be generated for a single directional beam or for multiple directional beams. Beam refinement reference signals for each directional beam may be distributed in at least part of or throughout the frequency resources of the control symbol. A receiving entity may measure received power levels of and/or other parameters related to the beam refinement reference signals and select a preferred beam refinement reference signal based on a comparison. One or more entities (e.g., a transmitting entity, a receiving entity) may adjust characteristics of a directional beam of a communication link between the transmitting entity and the receiving entity (e.g., a current directional beam) based on the preferred beam refinement reference signal.

A method of wireless communication is described. The method may include generating, by a first network entity, control information associated with a second network entity, generating one or more beam refinement reference signals for transmission on a communication link between the first network entity and the second network entity, each beam refinement reference signal corresponding to a directional beam, and transmitting an orthogonal frequency division multiplexing (OFDM) symbol that includes the control information in a first frequency resource and includes the one or more beam refinement reference signals in a second frequency resource that is different from the first frequency resource.

An apparatus for wireless communication is described. The apparatus may include means for generating, by a first network entity, control information associated with a second network entity, means for generating one or more beam refinement reference signals for transmission on a communication link between the first network entity and the second network entity, each beam refinement reference signal corresponding to a directional beam, and means for transmitting an orthogonal frequency division multiplexing (OFDM) symbol that includes the control information in a first frequency resource and includes the one or more beam refinement reference signals in a second frequency resource that is different from the first frequency resource.

Another apparatus for wireless communication is described. The apparatus may include a processor, memory in electronic communication with the processor, and instructions stored in the memory. The instructions may be operable to cause the processor to generate, by a first network entity, control information associated with a second network entity, generate one or more beam refinement reference signals for transmission on a communication link between the first network entity and the second network entity, each beam refinement reference signal corresponding to a directional beam, and transmit an orthogonal frequency division multiplexing (OFDM) symbol that includes the control information in a first frequency resource and includes the one or more beam refinement reference signals in a second frequency resource that is different from the first frequency resource.

A non-transitory computer readable medium for wireless communication is described. The non-transitory computer-readable medium may include instructions operable to cause a processor to generate, by a first network entity, control information associated with a second network entity, generate one or more beam refinement reference signals for transmission on a communication link between the first network entity and the second network entity, each beam refinement reference signal corresponding to a directional beam, and transmit an orthogonal frequency division multiplexing (OFDM) symbol that includes the control information in a first frequency resource and includes the one or more beam refinement reference signals in a second frequency resource that is different from the first frequency resource.

Some examples of the method, apparatus, and non-transitory computer-readable medium described above may further include processes, features, means, or instructions for receiving beam refinement feedback information including a beam index indicating a preferred beam refinement reference signal from the second network entity.

Some examples of the method, apparatus, and non-transitory computer-readable medium described above may further include processes, features, means, or instructions for adjusting a characteristic of the directional beam corresponding to the preferred beam refinement reference signal based at least in part on the beam refinement feedback information.

Some examples of the method, apparatus, and non-transitory computer-readable medium described above may further include processes, features, means, or instructions for generating the one or more beam refinement reference signals based at least in part on one or more digital directional beams associated with an analog directional beam of the communication link.

Some examples of the method, apparatus, and non-transitory computer-readable medium described above may further include processes, features, means, or instructions for assigning the one or more beam refinement reference signals to the second frequency resource of the OFDM symbol in a pattern.

In some examples of the method, apparatus, and non-transitory computer-readable medium described above, a first subset of beam refinement reference signals corresponds to a first digital directional beam associated with an analog beam of the communication link. In some examples of the method, apparatus, and non-transitory computer-readable medium described above, a second subset of beam refinement reference signals corresponds to a second digital directional beam associated with the analog beam.

In some examples of the method, apparatus, and non-transitory computer-readable medium described above, each of the beam refinement reference signals may have the same energy per resource element (EPRE).

Some examples of the method, apparatus, and non-transitory computer-readable medium described above may further include processes, features, means, or instructions for determining beam refinement reference signal configuration information indicating a configuration of the one or more beam refinement reference signals in the OFDM symbol, wherein the control information includes the beam refinement reference signal configuration information.

Some examples of the method, apparatus, and non-transitory computer-readable medium described above may further include processes, features, means, or instructions for determining a total transmission power. Some examples of the method, apparatus, and non-transitory computer-readable medium described above may further include processes, features, means, or instructions for determining a first transmission power for the control information based at least in part on the total transmission power and a first power parameter. Some examples of the method, apparatus, and non-transitory computer-readable medium described above may further include processes, features, means, or instructions for determining a second transmission power for the one or more beam refinement reference signals based at least in part on a remaining transmission power associated with the total transmission power and the first transmission power and a second power parameter, wherein the transmitting of the OFDM symbol may be based at least in part on the first transmission power and the second transmission power.

Some examples of the method, apparatus, and non-transitory computer-readable medium described above may further include processes, features, means, or instructions for assigning a total transmission power associated with the OFDM symbol between the control information and the one or more beam refinement reference signals.

Some examples of the method, apparatus, and non-transitory computer-readable medium described above may further include processes, features, means, or instructions for transmitting a second OFDM symbol associated with a third network entity, wherein the second OFDM symbol includes second control information associated with the third network entity in a third frequency resource and a second beam refinement reference signal in a fourth frequency resource different from the third frequency resource.

In some examples of the method, apparatus, and non-transitory computer-readable medium described above, the first network entity comprises a base station, and the second network entity comprises a user equipment (UE).

In some examples of the method, apparatus, and non-transitory computer-readable medium described above, the control information comprises downlink control information, and the OFDM symbol comprises a physical downlink control channel (PDCCH).

In some examples of the method, apparatus, and non-transitory computer-readable medium described above, the first network entity comprises a user equipment (UE), and the second network entity comprises a base station.

In some examples of the method, apparatus, and non-transitory computer-readable medium described above, the control information comprises uplink control information, and the OFDM symbol comprises a physical uplink control channel (PUCCH).

Some examples of the method, apparatus, and non-transitory computer-readable medium described above may further include processes, features, means, or instructions for transmitting, by the first network entity, the control information using a first antenna port. Some examples of the method, apparatus, and non-transitory computer-readable medium described above may further include processes, features, means, or instructions for transmitting, by the first network entity, the beam refinement reference signal using a second antenna port different from the first antenna port.

Some examples of the method, apparatus, and non-transitory computer-readable medium described above may further include processes, features, means, or instructions for determining a beam characteristic for each of a plurality digital directional beams based at least in part on a beam characteristics of a prior digital directional beam associated with the first network entity and the second network entity.

A method of wireless communication is described. The method may include receiving an orthogonal frequency division multiplexing (OFDM) symbol that includes control information in a first frequency resource and includes a plurality of beam refinement reference signals in a second frequency resource that is different from the first frequency resource, comparing a characteristic of at least some of the plurality of beam refinement reference signals, and transmitting beam refinement feedback information indicating a preferred beam refinement reference signal to a remote network entity based at least in part on the comparing.

An apparatus for wireless communication is described. The apparatus may include means for receiving an orthogonal frequency division multiplexing (OFDM) symbol that includes control information in a first frequency resource and includes a plurality of beam refinement reference signals in a second frequency resource that is different from the first frequency resource, means for comparing a characteristic of at least some of the plurality of beam refinement reference signals, and means for transmitting beam refinement feedback information indicating a preferred beam refinement reference signal to a remote network entity based at least in part on the comparing.

Another apparatus for wireless communication is described. The apparatus may include a processor, memory in electronic communication with the processor, and instructions stored in the memory. The instructions may be operable to cause the processor to receive an orthogonal frequency division multiplexing (OFDM) symbol that includes control information in a first frequency resource and includes a plurality of beam refinement reference signals in a second frequency resource that is different from the first frequency resource, compare a characteristic of at least some of the plurality of beam refinement reference signals, and transmit beam refinement feedback information indicating a preferred beam refinement reference signal to a remote network entity based at least in part on the comparing.

A non-transitory computer readable medium for wireless communication is described. The non-transitory computer-readable medium may include instructions operable to cause a processor to receive an orthogonal frequency division multiplexing (OFDM) symbol that includes control information in a first frequency resource and includes a plurality of beam refinement reference signals in a second frequency resource that is different from the first frequency resource, compare a characteristic of at least some of the plurality of beam refinement reference signals, and transmit beam refinement feedback information indicating a preferred beam refinement reference signal to a remote network entity based at least in part on the comparing.

In some examples of the method, apparatus, and non-transitory computer-readable medium described above, the characteristic comprises a received power level associated with the at least some of the plurality of beam refinement reference signals.

Some examples of the method, apparatus, and non-transitory computer-readable medium described above may further include processes, features, means, or instructions for identifying the preferred beam refinement reference signal of the plurality of beam refinement reference signals based at least in part on the comparing.

Some examples of the method, apparatus, and non-transitory computer-readable medium described above may further include processes, features, means, or instructions for identifying that the control information may be associated with the plurality of beam refinement reference signals. Some examples of the method, apparatus, and non-transitory computer-readable medium described above may further include processes, features, means, or instructions for identifying a predetermined configuration based at least in part on identifying that the control information may be associated with the plurality of beam refinement reference signals, wherein the comparing the characteristic may be based at least in part on the identified predetermined configuration.

Some examples of the method, apparatus, and non-transitory computer-readable medium described above may further include processes, features, means, or instructions for determining beam refinement reference signal configuration information from the control information, the beam refinement reference signal configuration information comprising a frequency resource of the OFDM symbol having the plurality of beam refinement reference signals, a number of the plurality of the beam refinement reference signals, an interlace pattern of the plurality of the beam refinement reference signals, or combination thereof, wherein the comparing may be based at least in part on the determining.

Some examples of the method, apparatus, and non-transitory computer-readable medium described above may further include processes, features, means, or instructions for identifying that the control information may be associated with the plurality of beam refinement reference signals. Some examples of the method, apparatus, and non-transitory computer-readable medium described above may further include processes, features, means, or instructions for determining beam refinement reference signal configuration information from the control information. Some examples of the method, apparatus, and non-transitory computer-readable medium described above may further include processes, features, means, or instructions for selecting a predetermined configuration from a set of predetermined configurations based at least in part on the beam refinement reference signal configuration information, wherein the comparing of the characteristic may be based at least in part on the predetermined configuration.

Some examples of the method, apparatus, and non-transitory computer-readable medium described above may further include processes, features, means, or instructions for identifying a beam index based at least in part on the comparing.

Some examples of the method, apparatus, and non-transitory computer-readable medium described above may further include processes, features, means, or instructions for measuring the characteristic of at least some of the plurality of beam refinement reference signals based at least in part on the control information, wherein comparing the characteristic of at least some of the plurality of beam refinement reference signals may be based at least in part on the measuring.

In some examples of the method, apparatus, and non-transitory computer-readable medium described above, the plurality of beam refinement reference signals may be transmitted via a plurality of digital directional beams generated from an analog directional beam, wherein the digital directional beams may be narrower than the analog directional beam.

Some examples of the method, apparatus, and non-transitory computer-readable medium described above may further include processes, features, means, or instructions for adjusting the characteristic of a directional beam based at least in part on the preferred beam refinement reference signal.

DETAILED DESCRIPTION

In some wireless communication systems, directional beams may be used to communicate information from a transmitting entity (e.g., a base station, a UE) to a receiving entity (e.g., a UE, a base station). These directional beams may be formed using a combination of analog beamforming techniques and digital beamforming techniques. A directional beam or directional beams may be characterized by a high-gain link that serves a limited geographic area. As one or more entities move through a coverage area of the wireless communication system, the directional beam may need to be adjusted. To adjust the characteristics of the directional beam, the transmitting entity may transmit beam refinement reference signals to the receiving entity. The receiving entity may compare the beam refinement reference signals to determine what characteristics of the directional beam should be adjusted.

Techniques are described herein to transmit beam refinement reference signals and control information in a control symbol. The beam refinement reference signals may occupy some frequency resources different from those occupied by control information. During a beam refinement procedure, a transmitting entity may generate a plurality of directional beams. Multiple beam refinement reference signals may be generated for a single directional beam or for multiple directional beams. Beam refinement reference signals for each directional beam may be distributed in at least part of or throughout the frequency resources of the control symbol. A receiving entity may measure received power levels of and/or other parameters related to the beam refinement reference signals and select a preferred beam refinement reference signal based on a comparison. One or more entities (e.g., a transmitting entity, a receiving entity) may adjust characteristics of a directional beam of a communication link between the transmitting entity and the receiving entity (e.g., a current directional beam) based on the preferred beam refinement reference signal.

Aspects of the disclosure are initially described in the context of a wireless communications system. Aspects of the disclosure are illustrated by and described with reference to resource structures and process flows. Aspects of the disclosure are further illustrated by and described with reference to apparatus diagrams, system diagrams, and flowcharts that relate to transmitting beam refinement reference signals during a control symbol.

Figure 1:
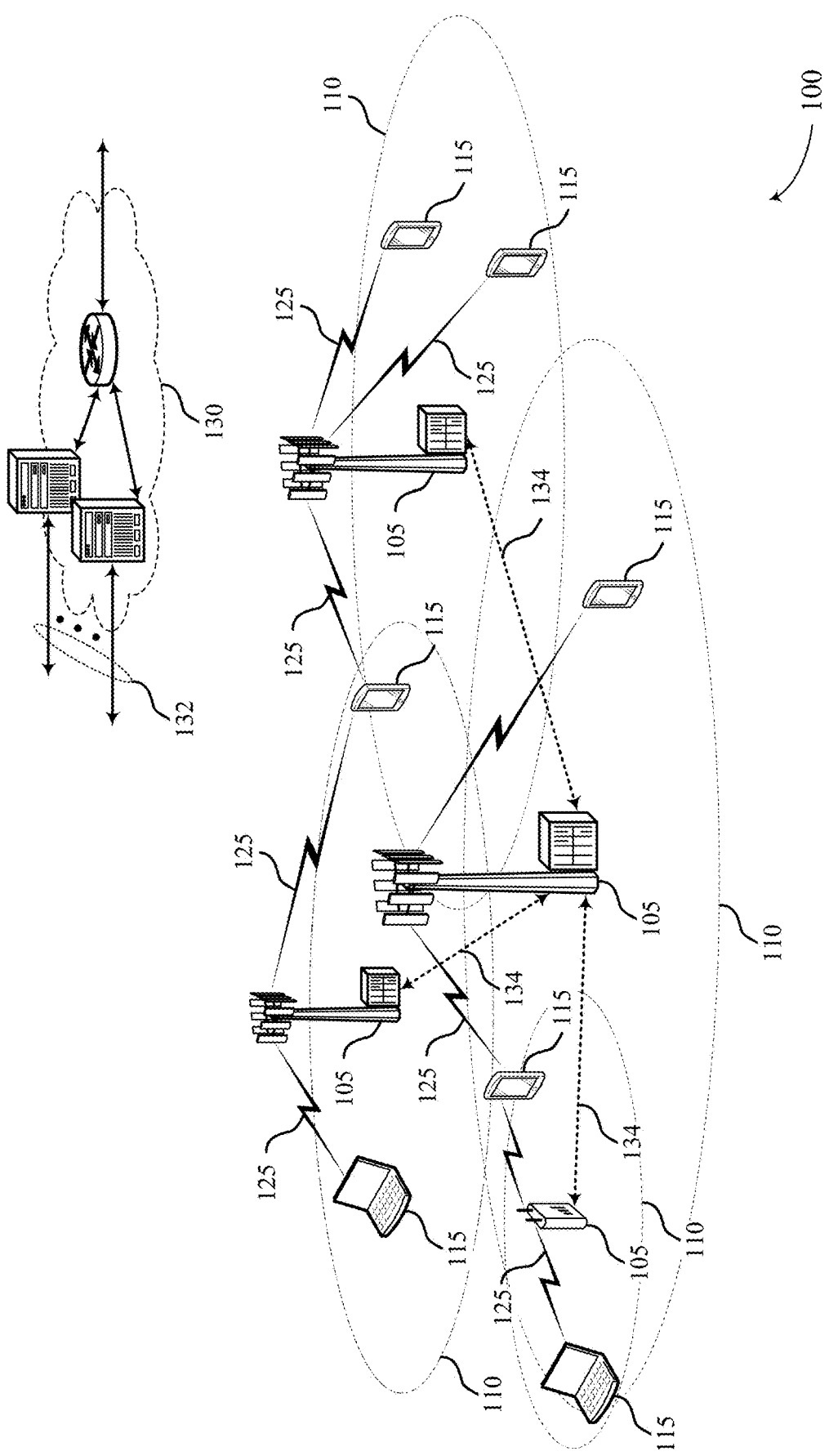
FIG. 1 illustrates an example of a system for wireless communication that supports transmitting beam refinement reference signals during a control symbol in accordance with aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a LTE (or LTE-Advanced) network, or a New Radio (NR) network. In some cases, wireless communication system 100 may support enhanced broadband communications, ultra-reliable (i.e., mission critical) communications, low latency communications, and communications with low-cost and low-complexity devices. The wireless communication system 100 may support directional communication links where data is transmitted using directional beams. Because UEs 115 are mobile throughout the wireless communication system 100, such directional beams may need to be adjusted to maintain the communication link. Beam refinement reference signals may be transmitted in a control symbol with control information as part of a beam refinement procedure. As an entity (e.g., a UE) moves through a coverage area of the wireless communication system, a directional beam may need to be adjusted. As part of this adjustment, a transmitting entity (e.g., a base station) may transmit beam refinement reference signals and control information to the receiving entity. The beam refinement reference signals and the control information may be transmitted in the same control symbol (e.g., an OFDM symbol). The receiving entity may compare the beam refinement reference signals to determine what characteristics of the directional beam should be adjusted.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an s1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user internet protocol (IP) packets may be transferred through the S-GW, which itself may be coupled with the P-GW. The P-GW may provide IP address allocation as well as other functions. The P-GW may be coupled with the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may include one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). Shared spectrum could include licensed radio frequency spectrum, unlicensed radio frequency spectrum, or a combination of licensed and unlicensed radio frequency spectrum. An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may include one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may include one or multiple symbols. In some cases, the TTI duration (that is, the number of symbols in a TTI) may be variable.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, time TDD or a combination of both.

Figure 2:
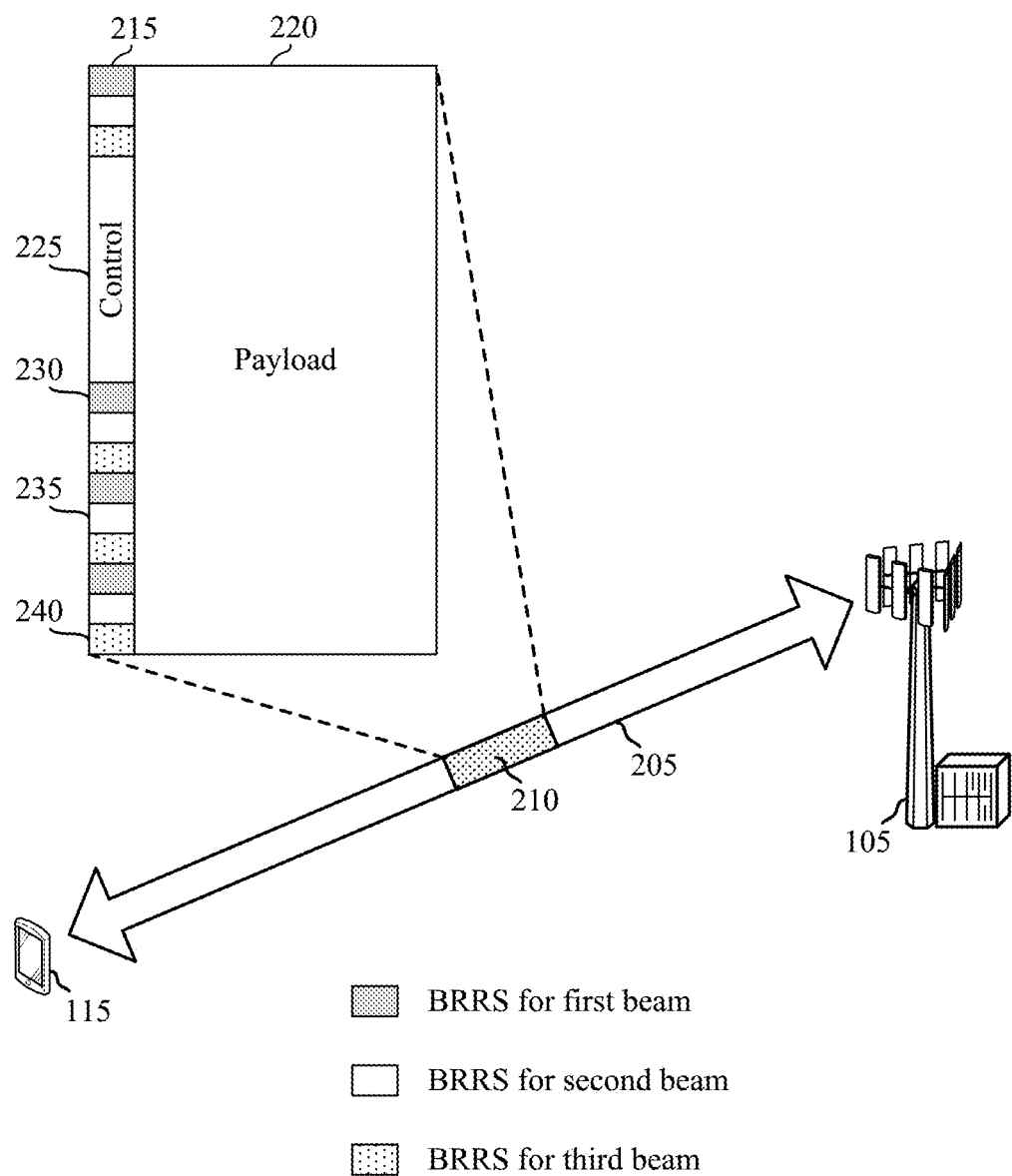
FIG. 2 illustrates an example of a wireless communication system that supports transmitting beam refinement reference signals during a control symbol in accordance with aspects of the present disclosure.

FIG. 2 illustrates an example of a wireless communication system 200 for transmitting beam refinement reference signals during a control symbol. The wireless communication system 200 may be an example of the wireless communication system 100 described with reference to FIG. 1. The wireless communication system 200 may include a base station 105 and a UE 115. While only a single base station 105-*a* and a single UE 115-*a* are depicted, the wireless communication system 200 may one or more additional base stations 105 and one or more additional UEs 115, among other components. The base station 105-*a* may be an example of the base stations 105 described with reference to FIG. 1. The UE 115-*a* be an example of the UEs 115 described with reference to FIG. 1.

The base station 105 and the UE 115 may exchange a plurality of transmissions 205 via a communication link 125. Transmissions 205 may be transmitted or received by either entity, the base station 105 or the UE 115. Packets may be communicated using communication resources of the transmissions 205. The communication resources may include a slot 210. The slot 210 may include a control portion 215 and a payload portion 220. Each control portion 215, 220 may comprise one or more orthogonal frequency division multiplexing (OFDM) symbols. A symbol may comprise frequency spectrum resources. The frequency spectrum resources may be broken into frequency subbands such that different information may be transmitted via different frequency subbands during a symbol. In some examples, the frequency resources are dynamically allocated to different pieces of information. In some examples, the control portion 215 comprises a single OFDM symbol having control information 225.

Transmissions 205 may be communicated via directional beams. Directional beams may be pointed in a specific direction or at a specific location and may provide a high-bandwidth link between a base station 105 and a UE 115. Signal processing techniques, such as beamforming, may be used to coherently combine energy to form the directional communication link. Wireless communication links achieved through beamforming may be associated with narrow beams (e.g., "pencil beams") that are highly directional, decrease inter-link interference, and provide high-bandwidth links between wireless nodes (e.g., base stations, access nodes, UEs). Such directional beams may serve a limited geographic area. In addition, directional beams be generated in an analog or digital manner. For example, an analog directional beam may be formed by adjusting the phases of individual antenna elements of an antenna array. The analog directional beam may include a plurality of digital directional beams formed by digitally manipulating the signals being transmitted. When digital directional beam are formed within an analog directional beam, the resulting directional beams may be referred to as hybrid directional beams.

When communicating via a directional beam, beam tracking operations may be needed to maintain the quality of the communication link. UEs 115 may move throughout a coverage area of the base station 105. Such movement may cause the UE 115 to move outside of the limited coverage area of a directional beam. To ensure that the directional beam remains pointed at the UE 115 and a high-quality communication link is maintained, beam tracking operations may use beam refinement reference signals (BRRSs) to adjust beam characteristics.

BRRSs may be transmitted during a control portion 215 of the slot 210 with the control information 225. For example, BRRSs (e.g., BRRSs 230, 235, 240) may be transmitted using frequency resources of a control OFDM symbol not being used by the control information.

Multiple BRRSs may be transmitted during a single control OFDM symbol. For instance, as part of a beam tracking operation, a transmitting entity (e.g., base station 105) may determine beam characteristics of a plurality of new directional beams based on the directional beam currently being used for communication. For example, the plurality of new directional beams may be pointed in slightly different directions than the current directional beam. The transmitting entity (e.g., base station 105) may generate BRRSs for each of the new directional beams and the current directional beam. In some examples, multiple BRRSs are generated for each directional beam. The transmitting entity (e.g., base station 105) may distribute these BRRSs of unused frequency resources of the control symbol in an interlaced structure to avoid frequency selective fading. FIG. 2 shows such a structure of a control symbol. BRRSs 230 may be associated with a first directional beam (e.g., a first new directional beam), BRRSs 235 may be associated with a second directional beam (e.g., a second new directional beam), and BRRSs 240 may be associated with a third direction beam (e.g., the current directional beam). FIG. 2 shows an exemplary distribution of the BRRSs 230, 235, 240 throughout frequency resources not being used by the control information 225. However, other distributions and other numbers of BRRSs are included within the scope of this disclosure.

Upon receiving the control symbol that includes both control information 225 and BRRSs 230, 235, 240, a receiving entity (e.g., UE 115) may measure the multiple BRRSs. The receiving entity (e.g., UE 115) may compare the received power levels of the BRRSs to determine which BRRS has the best received power level. The receiving entity (e.g., UE 115) may report which BRRS had the best power levels to the transmitting entity (e.g., base station 105). The transmitting entity (e.g., base station 105) may determine which directional beam is associated with the selected BRRS received from the receiving entity (e.g., UE 115). The transmitting entity (e.g., base station 105) may use the determined directional beam for the next transmission to the receiving entity (e.g., UE 115).

In some instances, the control information 225 may include data indicating that the control portion 215 or control symbol includes BRRSs and/or the structure of the BRRSs in the control portion 215 or control symbol. The data may include information regarding which frequency resources are being used to transmit BRRSs, how many BRRSs there are, a predetermined configuration of the BRRSs, or combinations thereof. In some examples, the structure of the BRRSs are semi-statically configured. In these examples, whenever control information 225 is detected, the receiving entity (e.g., UE 115) recalls predetermined information about the BRRSs. In some examples, the control information 225 may include the data about the BRRSs. In some examples, the control information 225 may include data indicating the one of a plurality of predetermined configurations of BRRSs have been used. These examples of control information may be a good tradeoff between a length of the control information and the flexibility of BRRSs configurations.

The transmit power levels of the control portion 215 or control symbol may be distributed in a variety of ways. For example, the control information 225 may be transmitted a first power level and the BRRSs may be transmitted a second power level different from the first power level. In some instances, control information transmission power has a higher priority than BRRS transmission power, if there is a total power limitation. If a total transmit power limitation exists, in some instances, the remaining transmit power not used by the control information 225 may be used for the BRRSs.

A receiving entity (e.g., UE 115) may compare received power levels of received BRRSs to select a preferred directional beam. To ensure that such a comparison is properly done, the transmitting entity (e.g., base station 105) may generate BRRSs such that each BRRS has the same energy per resource element (EPRE). In some examples, a configuration of BRRSs in the frequency resources of a control symbol may reduce effects of frequency selective fading on beam energy computations. In some instances, effective isotropic radiated power (EIRP) may be a limitation to the transmit power of a symbol. For example, some rules may stipulate that EIRP may not exceed 75 dBm at 100 MHz. In such examples, transmitting BRRSs over wideband allows more total transmit power to be used. Because total transmit power is shared between BRRSs and the control information 225, the transmitting entity (e.g., base station 105) may be able to use more transmit power for the control information 225.

In some cases, a slot 210 may include multiple control OFDM symbols, each control symbol targeting a different UE. For example, a first control symbol may include control information and BRRSs for a first UE and a second control symbol may include control information and BRRSs for a second UE. Such instances may arise when a delay in HARQ for the second UE is greater than zero.

BRRSs may be combined with either downlink control information or uplink control information. In some examples, the transmitting entity is a base station 105 and the receiving entity is a UE 115. In these examples, the control information is downlink control information related to a physical downlink control channel (PDCCH). In other examples, however, the transmitting entity may be a UE 115 and the receiving entity may be the base station 105. In these examples, the control information is uplink control information related to a physical uplink control channel (PUCCH). Some UEs may have limited capabilities to form directional beams, but some UEs may have the ability to form directional beams. In some instances, a UE 115 may transmit a BRRS from a first antenna port and a BRRS from a second antenna port different from the first antenna port.

Figure 3:
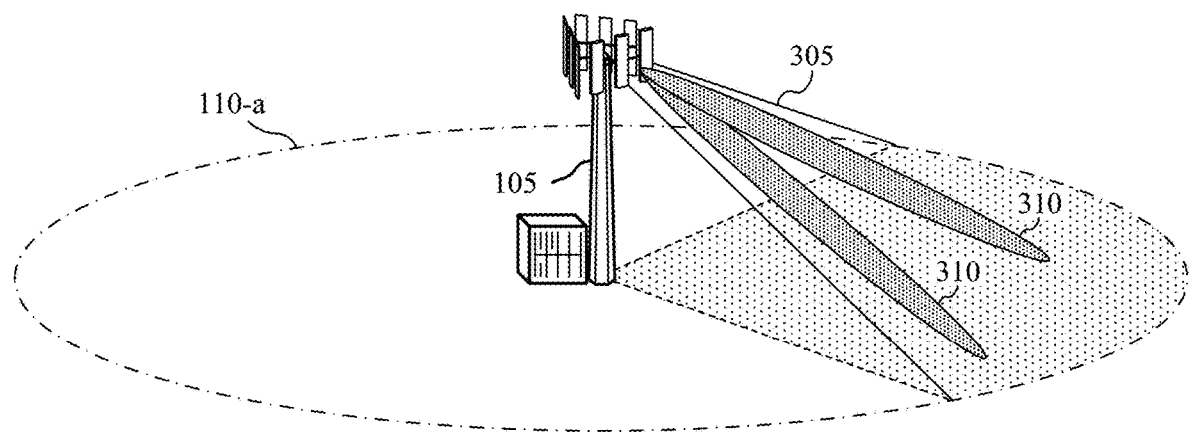
FIG. 3 illustrates an example of a wireless communication system that supports transmitting beam refinement reference signals during a control symbol in accordance with aspects of the present disclosure.

FIG. 3 illustrates an example of a wireless communication system 300 for transmitting beam refinement reference signals during a control symbol. The wireless communication system 300 shows hybrid directional beams that are formed of both an analog directional beam 305 and a digital directional beam 310. The wireless communication system 300 may be an example of the wireless communication systems 100 or 200 described with reference to FIGS. 1 and 2. The wireless communication system 300 may include a base station 105 having a coverage area 110. While only a single base station 105-a is depicted, the wireless communication system 300 may include additional base stations 105. The base station 105-a may be an example of the base stations 105 described with reference to FIGS. 1 and 2.

The analog directional beam 305 may be formed using a phased array antenna. The phased array antenna may include a plurality of antenna elements coupled to a single antenna port. The phase of each antenna element may be set such that a directional beam is formed. In some examples, the phases of the antenna elements may be adjusted by an analog phase shifter. Because the analog directional beam 305 is formed by shifting phases of the physical antenna elements, the analog directional beam 305 may be more difficult to adjust than a digital directional beam 310.

Digital directional beams 310 may be formed by applying a digital beam forming matrix to a signal or a transmission. Multiple digital directional beams 310 may be formed in a single analog directional beam 305. A receiving entity (e.g., UE 115) may be served using multiple digital directional beams 310. The digital directional beams 310 may be narrower than the analog directional beam 305. For example, the analog directional beam 305 may have a certain beam width (e.g., 24 degrees) and each of the digital directional beams 310 may have a beam width less than the certain beam width (e.g., 6 degrees). In this example, up to four digital directional beams (sometimes referred to as hybrid beams) may be formed within the analog directional beam 305. In some examples, an analog directional beam may be formed using antenna elements coupled to separate antenna ports. In some examples, digital directional beam 310 may be formed independently of an analog directional beam 305.

Hybrid directional beams are formed by generating a digital directional beam 310 in an analog directional beam 305. In this manner, a hybrid directional beam may include two independent directionality parameters. Both digital directional beams and analog directional beams include beam characteristics. Beam characteristics may include a beam width and a beam target location or a beam direction. Hybrid directional beams may not exceed the beam width of its base analog directional beam 305 and may not be pointed at a target location different from where the analog directional beam 305 is pointed. Beam width may be referred to in degrees.

Because of the difficulty in changing the phases of analog directional beams 305, it may be more difficult to frequency division multiplex data using a directional beam. As such, receiving entities (e.g., UE 115) may receive data in a TDM fashion from the transmitting entity (e.g., base station 105). Payload information and control information may both be transmitted to a receiving entity in a TDM fashion. Because analog directional beams may be very wideband transmissions, the transmitting entity may not need a full OFDM symbol to carry the control information in the analog directional beam. In these situations, a subset of frequency resources or a first frequency subband of the symbol may be needed to communication control information. Consequently, communication resources of the control symbol may go unused. Techniques are described herein to include BRRSs in the unused frequency resources of a control symbol.

Figure 4:
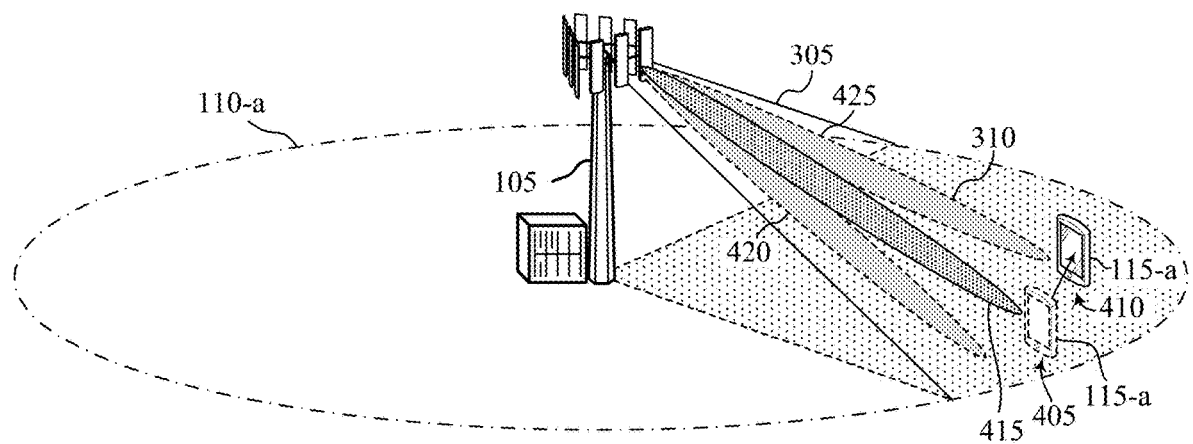
FIG. 4 illustrates an example of a wireless communication system that supports transmitting beam refinement reference signals during a control symbol in accordance with aspects of the present disclosure.

FIG. 4 illustrates an example of a wireless communication system 400 for transmitting beam refinement reference signals during a control symbol. The wireless communication system 400 depicts how UE 115 mobility may affect directional beams and related techniques in the present disclosure. The wireless communication system 400 may be an example of the wireless communication systems 100, 200, or 300 described with reference to FIGS. 1-3. The wireless communication system 400 may include a base station 105 having a coverage area 110 and UE 115. While only a single base station 105 and a single UE 115 is depicted, the wireless communication system 400 may include additional base stations 105 and/or additional UEs 115. The base station 105 may be an example of the base stations 105 described with reference to FIGS. 1-3. The UE 115 may be an example of the UEs 115 described with reference to FIGS. 1-3.

A UE 115 may move from a first location 405 to a second location 410 in a coverage area 110 of a base station 105. While in the first location 405, the UE 115 may have communicated with the base station 105 via a hybrid directional beam 415. The hybrid directional beam 415 may comprise a digital directional beam 310 formed inside of an analog directional beam 305. The second location 410 may be outside the service area of the hybrid directional beam 415 such that either the gain between the two entities is reduced or a radio link failure event occurs. To maintain a high-gain communication link, beam refinement operations may be initiated.

The transmitting entity (e.g., base station 105) may generate a plurality of new hybrid directional beams 420, 425 based on the current hybrid directional beam 415. For example, the hybrid directional beam 420, 425 may include similar beam characteristics as the current hybrid directional beam 415 except the hybrid directional beams 420, 425 are pointed in different directions. To determine which directional beam is best, beam refinement reference signals for each hybrid directional beam 415, 420, 425 may be transmitted to the receiving entity (e.g., UE 115). The receiving entity (e.g., UE 115) may measure the received powers of each of the BRRSs and compare those received powers. The receiving entity (e.g., UE 115) may identify which of the BRRSs has the highest received power. The receiving entity (e.g., UE 115) may transmit beam refinement feedback information indicating a preferred beam refinement reference signal to the transmitting entity. During the next transmission, the transmitting entity (e.g., 105) may use the hybrid directional beam associated with the preferred beam refinement reference signal to communicate data. In this manner, the directional beam used as a communication link between two entities may be refined to account for UE 115 mobility. In some examples, the preferred beam refinement reference signal may be referred to as an identified BRRS or a selected BRRS.

Figure 5:
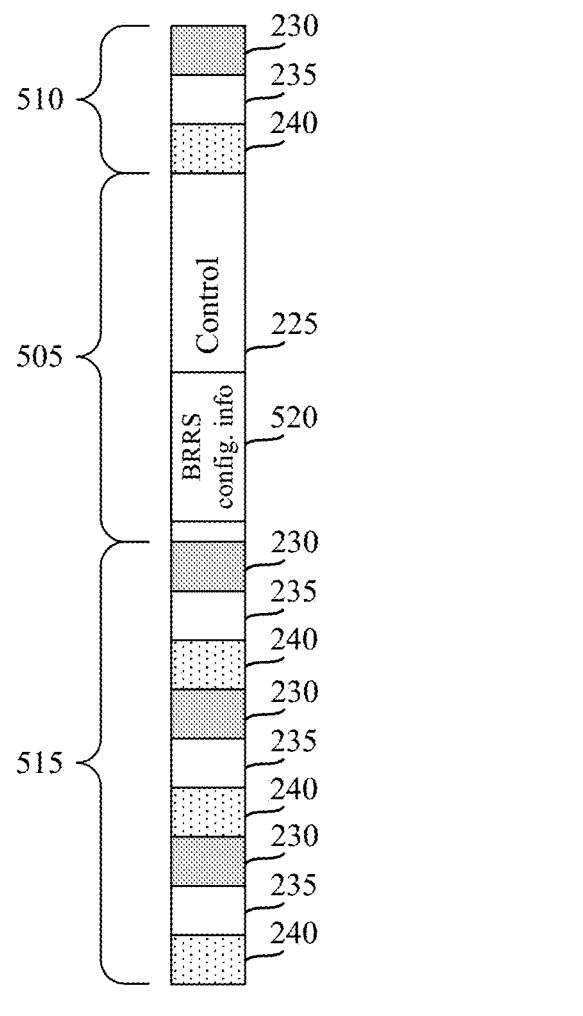
FIG. 5 illustrates an example of a control symbol that supports transmitting beam refinement reference signals during a control symbol in accordance with aspects of the present disclosure.

FIG. 5 illustrates an example of a control symbol 500 for transmitting beam refinement reference signals during a control symbol. The control symbol 500 includes control information 225 and beam refinement reference signals 230, 235, 240 associated with various directional beams. The control symbol 500 may be configured to convey control information to a receiving entity (e.g., UE 115). The control symbol 500 may be an example of the control portion 215 described with reference to FIG. 2.

As part of generating the control symbol 500, the transmitting entity may generate one or BRRSs based on directional beams used in a beam refinement procedure. Each BRRS may be associated with a specific directional beam used in the beam refinement procedure. For example, BRRS 230 may be associated with a first directional beam; BRRS 235 may be associated with a second directional beam; and BRRS 240 may be associated with a third directional beam.

BRRSs may comprise a signal having a predetermined transmit power and being transmitted using a predetermined hybrid directional beam. For example, BRRSs 230 may be transmitted via hybrid directional beam 415 at predetermined transmission power and BRRSs 235 may be transmitted via hybrid directional beam 420 at the predetermined transmission power. Any number of BRRSs may be transmitted as part of the control symbol 500. In some examples, each BRRS comprises the same energy per resource element (EPRE). This allows for receiving entities to make fair comparisons across BRRSs.

As part of generating the control symbol 500, the transmitting entity may allocate frequency resources to the control information 225 and the BRRSs 230, 235, 240. In some examples, the transmitting entity may determine frequency resources to be used by the control information 225 and allocate the remaining frequency resources to be used by BRRSs. For example, the control information 225 may be in a first set of frequency resources 505 (sometimes referred to as frequency subbands). The amount of the first set of frequency resources 505 may be based on content of the control information 225 being transmitted. The transmitting entity may identify unused frequency resources of the control symbol 500 and assign those frequency resources to BRRSs. For examples, the transmitting entity may allocate a second set of communication resources 510 and a third set of communication resources 515 to BRRS. In some examples, the frequency resources allocated to BRRSs are continuous frequency resources. In some examples, as shown in FIG. 5, the frequency resources allocated to BRRSs may be discontinuous frequency resources scattered throughout the frequency spectrum band used by the control symbol 500.

The transmitting entity may distribute BRRSs through the control symbol 500 to reduce the effects of frequency selective fading. The sets of communication resources 510, 515 may be divided into subsets of communication resources assigned to individual BRRSs. The transmitting entity may determine these distributions of BRRSs based on predetermined configurations of BRRSs. These predetermined configurations may distribute BRRSs in a pattern across different frequency spectrum of the control symbol 500. For example, BRRSs 230, 235, 240 are arranged in an interlace pattern in FIG. 5. Other types of patterns are included within the scope of this disclosure.

In some examples, the transmitting entity may allocate subsets of frequency resources to certain BRRSs on an individual basis. The size of an individual subset of frequency resources may be based on the frequency spectrum used by a directional beam associated with the BRRS being transmitted using the subset of frequency resources.

To communicate the configurations of BRRSs in the control symbol 500, the transmitting entity may include BRRS configuration information 520 in the control information 225. The BRRS configuration information 520 may indicate that BRRSs are included in the control symbol 500, the structure or configuration of the BRRSs, the pattern of the BRRSs in the control symbol 500, the number of BRRSs, the number of directional beams being considered during the beam refinement procedures, the number of BRRSs associated with each directional beam in the beam refinement procedures, the frequency resources being used by the BRRSs, the size of frequency resources being used by BRRSs, a number of continuous frequency resources or subbands being used by the BRRSs, the size of each continuous frequency resource being used by BRRSs, or combinations thereof.

In some instances, the configuration of BRRSs is predetermined and both the transmitting entity and the receiving entity already know the configuration. In these instances, the BRRS configuration information 520 may only indicate that BRRSs are present in the control symbol 500. Upon receiving the beam refinement reference signal control information, the receiving entity may retrieve the predetermined configuration and perform its beam refinement procedures accordingly.

In some instances, the transmitting entity may dynamically configure the BRRSs in each control symbol 500. In these instances, the BRRS configuration information 520 may include information about characteristics of each BRRS transmission. Such an instance provides flexibility for the placement and characteristics of BRRSs in the control symbol 500, but the BRRS configuration information 520 may become quite large.

In some instances, the transmitting entity may select a predetermined configuration of BRRSs from a set of predetermined configurations of BRRSs. In these instances, the transmitting entity and the receiving entity may know the set of predetermined configurations. Such an approach provides flexibility in the distribution of BRRSs in a control symbol 500, but also limits the size of the BRRS configuration information 520.

Figure 6:
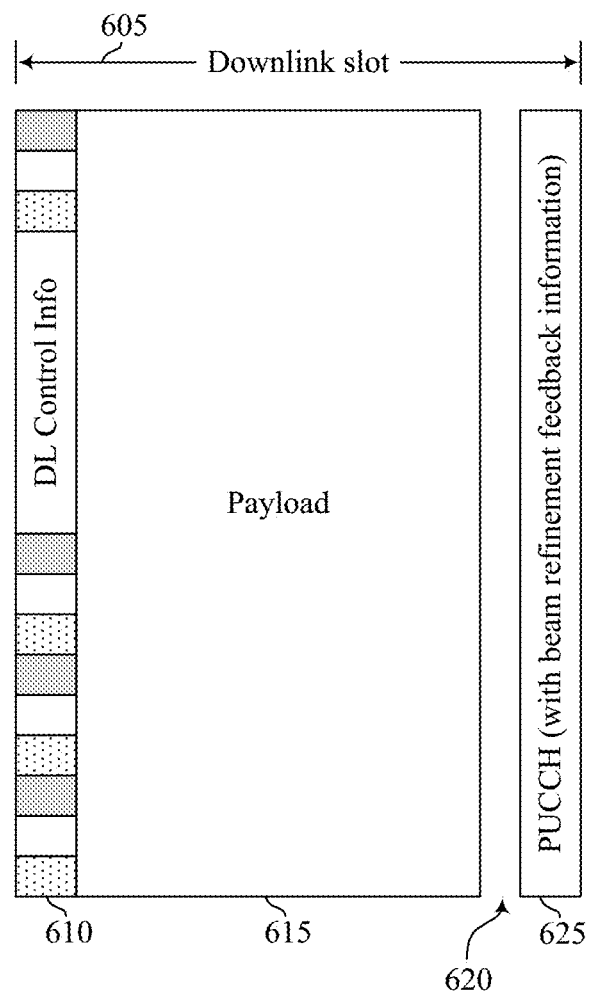
FIG. 6 illustrates an example of a resource structure that supports transmitting beam refinement reference signals during a control symbol in accordance with aspects of the present disclosure.

FIG. 6 illustrates an example of a resource structure 600 for transmitting beam refinement reference signals using a control symbol. The resource structure 600 may be configured to perform a beam refinement procedure using communication resources normally controlled by the entity that is refining directional beams (e.g., the transmitting entity). The resource structure 600 may comprise a downlink slot 605 in a communication link between a base station 105 and a UE 115. The resource structure 600 may illustrate how a base station 105 may implement beam refinement procedures using the control symbol 500 in a single downlink slot 605.

The downlink slot 605 may include a control symbol 610, a payload 615, and an uplink symbol 625. The control symbol 610 and the payload 615 may be transmitted via the transmitting entity and the uplink symbol 625 may be transmitted by the receiving entity. A gap 620 may exist between the transmitting entity portions (e.g., control symbol 610 and payload 615) and the receiving entity portions (e.g., uplink symbol 625) of the downlink slot 605. The gap 620 may be sized to reduce interference between the separate transmissions. The control symbol 610 may be an example of the control symbols 215, 500 described with reference to FIGS. 2 and 5. In some examples, the payload 615 may be an example of a physical downlink shared channel (PDSCH). The payload 615 may include data, control information, or combinations thereof. In some examples, the uplink symbol 625 may be an example of a physical uplink control channel (PUCCH).

The downlink slot 605 may be used to perform beam refinement procedures during a single slot. The control symbol 610 may include control information and BRRSs associated with directional beams. After receiving the control symbol 610 and while still receiving the payload 615, the receiving entity may measure the received powers of the BRRSs and select a preferred BRRS. The receiving entity may transmit beam refinement feedback information indicating the preferred BRRS to the transmitting entity as part of the uplink symbol 625.

The beam refinement feedback information may indicate which BRRS or set of BRRSs had the best measured received power during the control symbol 610. The receiving entity may measure the received powers of each BRRS, compare those received powers, and determine which received power is the best. The beam refinement feedback information may include a beam index indicating the preferred BRRS.

The control information in the control symbol 610 may include data indicating characteristics of the uplink symbol 625 available to be transmitted during the downlink slot 605. The characteristics of the uplink symbol 625 may include the position of the uplink symbol 625 in the slot, the frequency resources allocated to the uplink symbol 625, or combinations thereof.

In some examples, the downlink slot 605 may not include the uplink symbol 625 or the gap 620. Instead, the receiving entity may transmit beam refinement feedback information at the next available uplink control transmission in the next uplink centric slot.

In some instances, a UE 115 may implement beam refinement procedures instead of a base station 105. These instances may arise when a UE 115 is capable of forming analog directional beams, digital directional beams, or hybrid directional beams. A UE 115 may use the resource structure 600 to perform beam refinement procedures with a few modifications. Such modifications may include the downlink slot 605 being an uplink centric slot, the control symbol 610 including uplink control information, the payload 615 may be an example of physical uplink shared channel (PUSCH), and the uplink symbol 625 may be an example of a downlink symbol and/or a PDCCH. In these situations, the UE 115 may transmit a control symbol during a first portion of an uplink slot and the base station 105 may reply within that same uplink centric slot using a downlink symbol.

Figure 7:
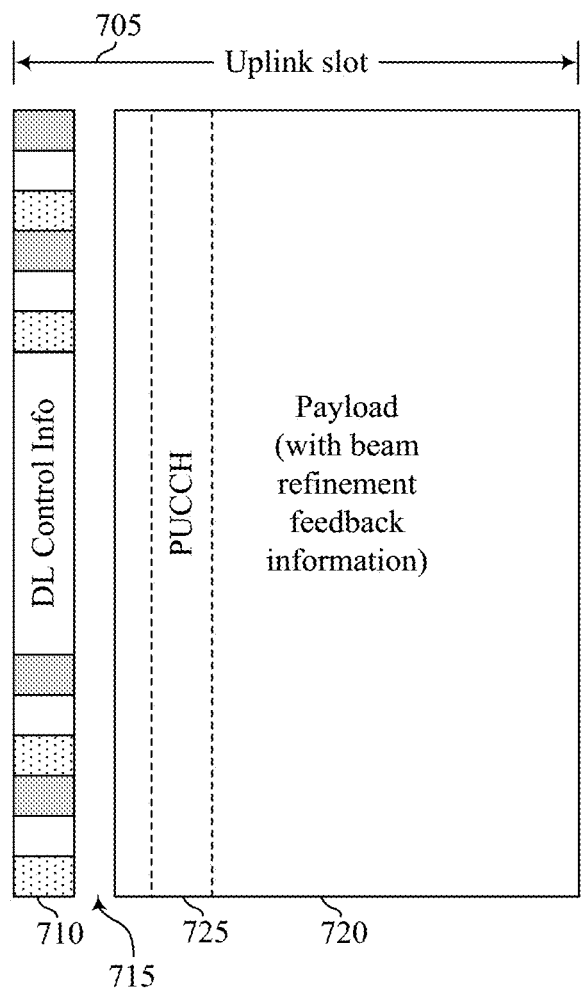
FIG. 7 illustrates an example of a resource structure that supports transmitting beam refinement reference signals during a control symbol in accordance with aspects of the present disclosure.

FIG. 7 illustrates an example of a resource structure 700 for transmitting beam refinement reference signals during a control symbol. The resource structure 700 may comprise uplink slot 705 in a communication link between a base station 105 and a UE 115. The resource structure 700 may be configured to perform a beam refinement procedure using communication resources normally controlled by the entity that receives information via a directional beams (e.g., the receiving entity). The resource structure 700 may illustrate how a base station 105 may implement beam refinement procedures using the control symbol 500 in a single uplink slot 705.

The uplink slot 705 may include a control symbol 710, a payload 720, and an uplink symbol 725. The control symbol 710 may be transmitted via the transmitting entity (e.g., base station 105) and the payload 720 may be transmitted via the receiving entity (e.g., UE 115). A gap 715 may exist between the transmitting entity portions (e.g., control symbol 710) and the receiving entity portions (e.g., payload 720) of the uplink slot 705. The gap 715 may be sized to reduce interference between the separate transmissions. The control symbol 710 may be an example of the control symbols 215, 500, 610 described with reference to FIGS. 2, 5, and 6. In some examples, the payload 720 may be an example of a physical uplink shared channel (PUSCH). In some examples, the uplink symbol 725 may be an example of a physical uplink control channel (PUCCH).

The uplink slot 705 may be used to perform beam refinement procedures during a single slot. The control symbol 710 may include control information and BRRSs associated with directional beams. The control symbol 710 may be transmitted by the entity that uses the directional beams. After receiving the control symbol 710, the receiving entity may measure the received powers of the BRRSs and select a preferred BRRS. The receiving entity may transmit beam refinement feedback information indicating the preferred BRRS to the transmitting entity as part of the uplink symbol 725.

As part of the uplink slot 705, the receiving entity (e.g., UE 115) may have some information to communication to the transmitting entity (e.g., base station 105). In some examples, while transmitting the payload 720, the receiving entity may determine which BRRS has the best received power. Optionally, the receiving entity may transmit an uplink symbol 725 that includes beam refinement feedback information sometime during the payload 720 portion of the uplink slot 705. In this manner, a beam refinement procedure may be executed during a single uplink slot.

In some instances, a UE 115 may implement beam refinement procedures instead of a base station 105. These instances may arise when a UE 115 is capable of forming analog directional beams, digital directional beams, or hybrid directional beams. A UE 115 may use the resource structure 700 to perform beam refinement procedures with a few modifications. Such modifications may include the uplink slot 705 being a downlink centric slot, the control symbol 710 may include uplink control information, the payload 615 may be an example of physical uplink shared channel (PUSCH), and the uplink symbol 725 may be an example of a downlink symbol and/or a PDCCH. In these situations, the UE 115 may transmit a control symbol during a first portion of a downlink slot and the base station 105 may reply within that same downlink centric slot.

Figure 8:
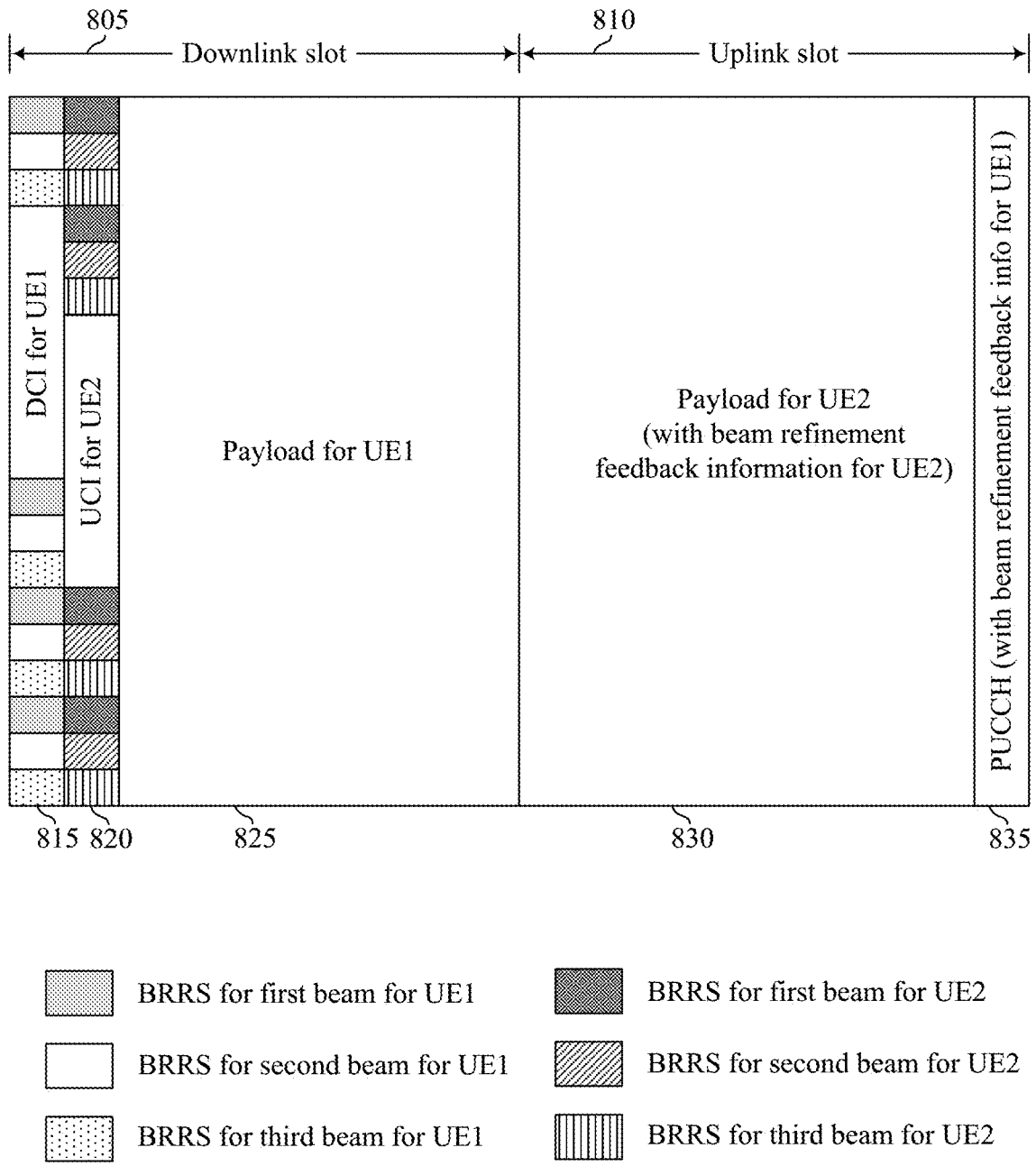
FIG. 8 illustrates an example of a resource structure that supports transmitting beam refinement reference signals during a control symbol in accordance with aspects of the present disclosure.

FIG. 8 illustrates an example of a resource structure 800 for transmitting beam refinement reference signals during a control symbol. The resource structure illustrates transmitting, by the base station (e.g., transmitting entity), BRRSs associated two different UEs (e.g., receiving entities) in a single slot. The resource structure 800 includes a downlink slot 805 and an uplink slot 810. The resource structure 800 may be used by a base station 105 to implement beam refinement procedures. In some examples, the resource structure 800 may be modified to be used by a UE 115 to perform beam refinement procedures.

The downlink slot 805 may include a first control symbol 815 associated with a first UE 115, a second control symbol 820 associated with a second UE 115, and a payload 825 for the first UE 115. The uplink slot 810 may include a payload 830 and an uplink control symbol 835. The payload 825 may be an example of a PDSCH for the first UE 115. The payload 830 may be an example of a PUSCH for the second UE 115. In the illustrative example of FIG. 8, downlink slot 805 is associated with the first UE 115 and the uplink slot 810 is associated with the second UE 115.

In some situations, it may be useful to transmit control symbols that include BRRSs for multiple receiving entities (e.g., multiple UEs 115) in the same slot. For example, if the HARQ for one UE 115 is greater than zero, it may be useful to transmit control symbols that include BRRSs in the same slot. The first control symbol 815 may include a DL grant for the slot that the first control symbol 815 is transmitted in. The second control symbol 820 may include a UL grant for a subsequent UL slot (e.g., slot 810) to the current downlink slot 805. In some examples, the uplink slot 810 may be directly after the downlink slot 805 in time. However, in other examples, the downlink slot 805 and the uplink slot 810 may be separate by other slots.

Both the first control symbol 815 and the second control symbol 820 may include control information for their respective UEs and BRRSs for their UEs. The first control symbol 815 may include downlink control information (DCI) associated with the downlink slot 805 and the first UE 115. The second control symbol 820 may include uplink control information (UCI) associated with the uplink slot 810 and the second UE 115. The control information may include the grants of communication resources. The control information may be examples of the control information 225 described with reference to FIGS. 2-6. The BRRSs may be examples of the BRRSs described with reference to FIGS. 2-6.

Both the first UE 115 and the second UE 115 may generate beam refinement feedback information based on their respective control symbols 815, 820. The first UE 115 may transmit its beam refinement feedback information to the base station 105 using the symbol 835. The second UE 115 may transmit its beam refinement feedback information to the base station 105 using the payload 830. In some examples, the beam refinement feedback information associated with the second UE 115 may be transmitted via a control symbol transmitted during the payload.

The symbol 835 may be transmitted during the uplink control slot 810. The control information in the second control symbol 820 may include data indicating that a portion of the uplink slot 810 is reserved for transmitting the symbol 835 that includes the beam refinement feedback information for the first UE 115.

In some examples, the resource structure 800 may be implemented in conjunction with either the resource structure 600 or the resource structure 700. In addition, the resource structures 600, 700, 800, or modifications thereof, may be implemented using either a base station 105 or a UE 115 as the entity executing beam refinement procedures to refine directional beams.

Figure 9:
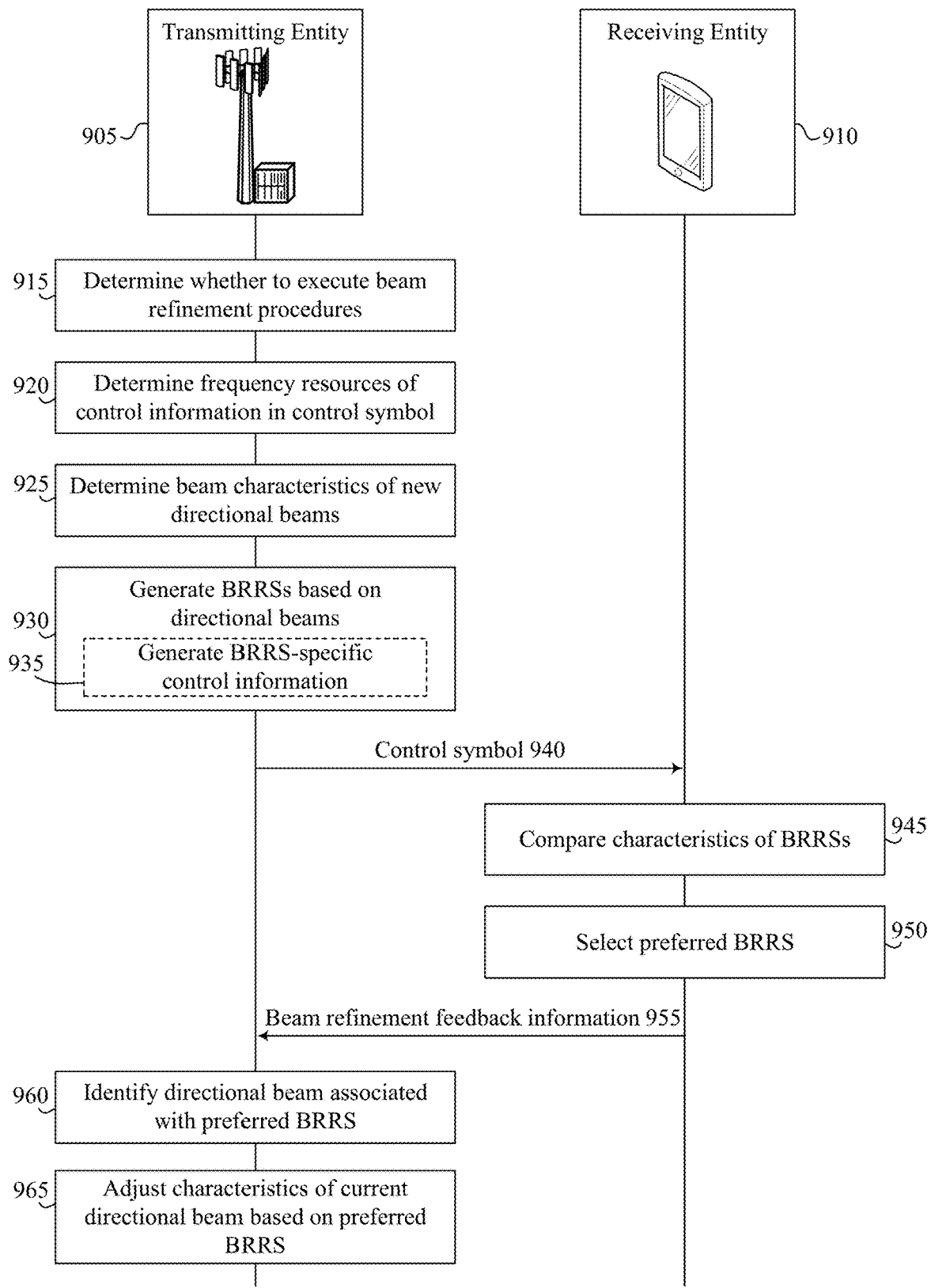
FIG. 9 illustrates an example of a process flow that supports transmitting beam refinement reference signals during a control symbol in accordance with aspects of the present disclosure.

FIG. 9 illustrates an example of a process flow 900 for transmitting beam refinement reference signals during a control symbol. The process flow 900 may be an example of a beam refinement procedure performed by a transmitting entity 905 in conjunction with directional communication links between the transmitting entity 905 and a receiving entity 910.

The transmitting entity 905 may be the entity that is generating directional beams. Consequently, the transmitting entity 905 may be the entity that is performing a beam refinement procedure or a beam tracking procedure for directional beams. In the illustrative example, the transmitting entity 905 may be a base station 105. However, in other examples, the transmitting entity 905 may be a base station 105, a UE 115, or any other network entity.

The receiving entity 910 may be the entity that is receiving data and/or control via a directional beam. The receiving entity 910 may participate in the beam refinement procedure, but the receiving entity is not adjusting any directional beams in the beam refinement procedure or beam tracking procedure. In the illustrative example, the receiving entity 910 may be a UE 115. However, in other examples, the receiving entity 910 may be a base station 105, a UE 115, or any other network entity.

The transmitting entity 905 and the receiving entity 910 may communicate via a directional communication link. The directional communication link may include transmission of data via a directional beam such as an analog directional beam, a digital directional beam, or a hybrid directional beam. As a UE 115 moves through a coverage area of a base station 105, the directional beams of the communication link may need to be refined to maintain a high-quality link. As such, the transmitting entity and the receiving entity may cooperate to perform beam refinement procedures.

At block 915, the transmitting entity 905 may determine whether to execute a beam refinement procedure. Such a determination may be based on location information of either the transmitting entity 905 or the receiving entity 910, an amount of time since the last beam refinement procedure, signal strength and quality indicators, other information, or combinations thereof. In some examples, the receiving entity 910 may perform the steps of block 915. For example, the receiving entity 910 may determine that the signal quality of the directional beam satisfies a threshold. Upon satisfying a threshold, the receiving entity 910 may indicate via a message to the transmitting entity 905 that a beam refinement procedure should be initiated.

At block 920, the transmitting entity 905 may determine frequency resources of an OFDM control symbol being used by control information. The transmitting entity 905 may also determine what frequency resources of the OFDM control symbol are not used by control information or for any other purposes. The transmitting entity 905 may allocate the unused communication resources to be used by BRRSs associated with the communication link between the transmitting entity 905 and the receiving entity 910. The transmitting entity 905 may generate the control information as part of block 920.

At block 925, the transmitting entity may determine beam characteristics for new directional beams as part of the beam refinement procedure. The new digital directional beams may be based on a current directional beam being used to communicate information from the transmitting entity 905 to the receiving entity 910. For example, the new directional beams may be similarly embodied as the current directional beam but pointed in different directions. The directional beams may be hybrid directional beams, analog directional beams, or digital directional beams. Beam characteristics for the new directional beams may include beam width, beam target, or combinations thereof.

At block 930, the transmitting entity 905 may generate BRRSs based on the directional beams. In some examples, BRRSs are generated for both the new directional beams and the current directional beam. The BRRSs are configured to provide a reference from which the transmitting entity 905 may determine how to refine the current directional communication link between the transmitting entity 905 and the receiving entity 910 to provide high-quality communications between the transmitting entity 905 and the receiving entity 910. The BRRSs may be associated with the communication link between the transmitting entity 905 and the receiving entity 910. The BRRSs may be generated based on one or more digital directional beams associated with an analog directional beam of the communication link.

The BRRSs may be assigned to frequency resources of the OFDM control symbol not being used for other items, such as control information. The transmitting entity 905 may assign BRRSs to frequency resources or frequency subbands different from the frequency resources associated with the control information.

The transmitting entity 905 may generate a first set of BRRSs to correspond to a single directional beam. These sets of BRRSs may then be distributed among the frequency resources of the OFDM control symbol to reduce the effects of frequency selective fading. The transmitting entity may generate a second set of BRRSs to correspond to a different directional beam. The first set and the second set of BRRSs may distributed in an interlaced pattern across the frequency resources of the OFDM control symbol. Additional sets of BRRSs may be generated by transmitting entity 905. In some examples, every directional beam determined as part of beam refinement procedure has a corresponding set of BRRSs.

The transmitting entity 905 may determine the transmit power of the BRRSs based on power controls. For example, the transmitting entity each BRRS to have the same energy per resource element (EPRE). In this manner, comparisons of BRRSs may more accurately demonstrate which BRRS has the best received power.

In other examples, the transmitting entity 905 may determine the transmit power of BRRSs based on a total transmission power of the OFDM control symbol and the transmission power of the control information. The transmitting entity 905 may determine a total transmission power, a first transmission power for the control information, and a second transmission power for the BRRSs. The first transmission power may be based on a first power parameter such as how much power is needed to successful transmit the control information. The second transmission power may be based on a second power parameter related to the first parameter. The second transmission power may be divided amongst each of the individual BRRSs that make up the OFDM control signal. The second transmission power may be determined based on the remaining transmission power associated with the total transmission power and the first transmission power, and the second power parameter. The OFDM control symbol may be based on the first transmission power and the second transmission. In some examples, the transmitting entity 905 may distribute a total transmission power of the OFDM control symbol between the control information and the BRRSs based on EIRP.

At block 935, the transmitting entity may generate BRRS-specific control information. The BRRS-specific control information may be an example of BRRS configuration information 520 described with reference to FIG. 5. The BRRS-specific control information may indicate that BRRS are in the OFDM control symbol, the pattern of the BRRSs in the OFDM control symbol, frequency resources used by the BRRSs in the OFDM symbol, other information, or combinations thereof. In some examples, the BRRS-specific control information may include beam refinement signal configuration information indicating a configuration of the one or more BRRSs in the OFDM control symbol. In some cases, the beam refinement signal configuration information may indicate a predetermined configuration of the one or more BRRSs. In addition, the transmitting entity 905 may determine beam refinement signal configuration information indicating a configuration of the one or more BRRSs in the OFDM control symbol. The transmitting entity 905 may include the BRRS-specific control information in the control information of the OFDM symbol.

The transmitting entity 905 may generate and transmit the OFDM control symbol 940. The OFDM control symbol 940 may include control information in a first frequency resource and may include BRRSs in a second frequency resource different from the first frequency resource.

In some examples, a single slot may include multiple OFDM control symbols 940. in some examples, each of the OFDM control symbols 940 may correspond to a different receiving entity 910. For example, the transmitting entity 905 may generate and transmit a second OFDM symbol associated with a second receiving entity 910. Where the second OFDM symbol include control information associated with the second receiving entity 910 and BRRSs associated with the second receiving entity 910. The second receiving entity 910 being different from the first receiving entity 910.

At block 945, the receiving entity 910 may compare characteristics of the BRRSs to determine which BRRS is a preferred BRRS. As part of comparing the characteristics, the receiving entity 910 may decode the control information to determine the location and configuration of the BRRSs in the OFDM control symbol 940. The receiving entity 910 may identify a portion of the control information that is associated with the BRRSs. The receiving entity 910 may determine beam refinement reference signal configuration information from the control information. In some examples, the receiving entity 910 may identify a predetermined configuration from a set of predetermined configurations of the BRRSs. The receiving entity 910 may measure the characteristics of the based on the decoding and related operations. The characteristic being compared by the receiving entity 910 may be received power levels of the BRRSs.

At block 950, the receiving entity 910 may select a preferred BRRS based on the comparisons of the characteristics. The preferred BRRS may be the BRRS that has the highest received power level in the OFDM control symbol 940. The preferred BRRS may be the BRRS a set of BRRSs associated with a single directional beam that has the highest received power level of the sets of BRRSs in the OFDM control symbol 940.

The receiving entity 910 may generate and transmit beam refinement feedback information 955 to the transmitting entity 905. The beam refinement feedback information may include an indication the preferred BRRS. In some examples, the beam refinement feedback information includes a beam index of the preferred BRRS. The beam refinement feedback information 955 may be transmitted using a control symbol.

At block 960, the transmitting entity 905 may identify a directional beam based on the preferred BRRS indicated in the beam refinement feedback information 955. In addition, the transmitting entity 905 may identify differences between the identified directional beam and the current directional beam used to communicate data between the transmitting entity 905 and the receiving entity 910.

At block 965, the transmitting entity 905 may adjust one or more characteristics of the current directional beam based on the preferred BRRS indicated in the beam refinement feedback information. In this manner, the current directional beam may be refined or modified to maintain a high-quality link with the receiving entity 910. In some examples, the direction or the beam target of the current directional beam may be adjusted.

Figure 10:
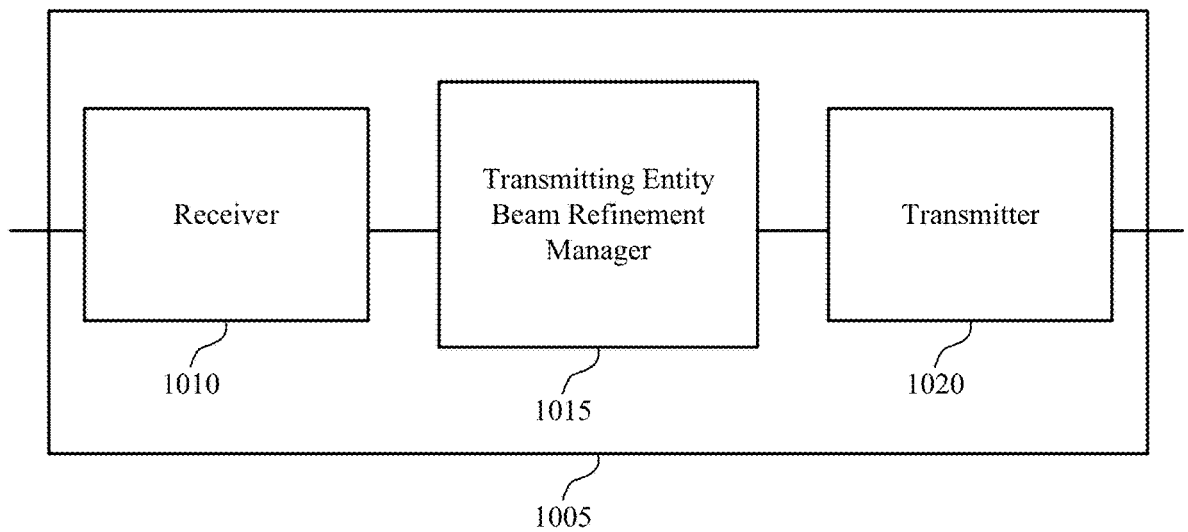
FIGS. 10 through 12 show block diagrams of a device that supports transmitting beam refinement reference signals during a control symbol in accordance with aspects of the present disclosure.

FIG. 10 shows a block diagram 1000 of a wireless device 1005 that supports transmitting beam refinement reference signals during a control symbol in accordance with various aspects of the present disclosure. Wireless device 1005 may be an example of aspects of a transmitting entity 905 as described with reference to FIG. 1. Wireless device 1005 may include receiver 1010, transmitting entity beam refinement manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to transmitting beam refinement reference signals during a control symbol, etc.). Information may be passed on to other components of the device. The receiver 1010 may be an example of aspects of the transceiver 1335 described with reference to FIG. 13.

Transmitting entity beam refinement manager 1015 may be an example of aspects of the transmitting entity beam refinement manager 1315 described with reference to FIG. 13. Transmitting entity beam refinement manager 1015 may generate, by a first network entity, control information associated with a second network entity, generate one or more beam refinement reference signals for transmission on a communication link between the first network entity and the second network entity, each beam refinement reference signal corresponding to a directional beam, and transmit an orthogonal frequency division multiplexing (OFDM) symbol that includes the control information in a first frequency resource and includes the one or more beam refinement reference signals in a second frequency resource that is different from the first frequency resource. In some examples, the one or more beam refinement reference signals may be associated with a communication link between the first network entity and the second network entity.

The transmitting entity beam refinement manager 1015 may be implemented in hardware, software executed by a processor, firmware, or any combination thereof. If implemented in software executed by a processor, the functions of transmitting entity beam refinement manager 1015 may be executed by a general-purpose processor, a DSP, an ASIC, a field-programmable gate array (FPGA) or other programmable logic device, discrete gate or transistor logic, discrete hardware components, or any combination thereof designed to perform the functions described in the present disclosure. The transmitting entity beam refinement manager 1015 may be physically located at various positions, including being distributed such that portions of functions are implemented at different physical locations by one or more physical devices. In some examples, transmitting entity beam refinement manager 1015 may be a separate and distinct component in accordance with various aspects of the present disclosure. In other examples, transmitting entity beam refinement manager 1015 may be combined with one or more other hardware components, including but not limited to a receiver, a transmitter, a transceiver, one or more other components described in the present disclosure, or a combination thereof in accordance with various aspects of the present disclosure.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
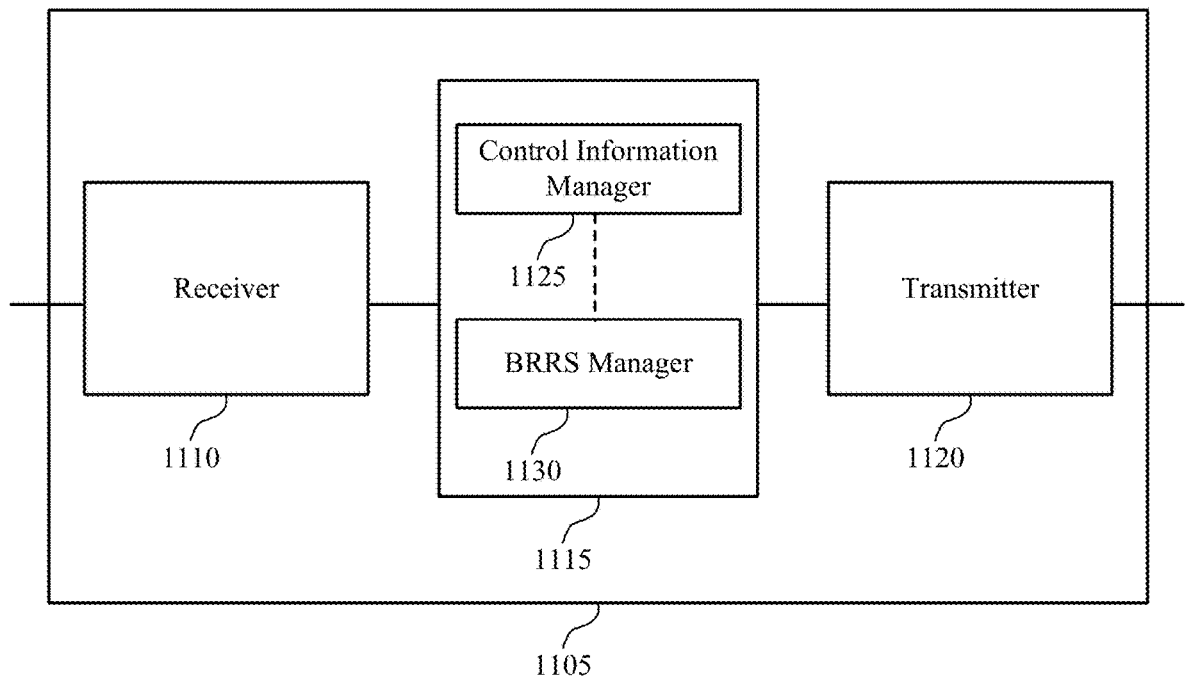

FIG. 11 shows a block diagram 1100 of a wireless device 1105 that supports transmitting beam refinement reference signals during a control symbol in accordance with various aspects of the present disclosure. Wireless device 1105 may be an example of aspects of a wireless device 1005 or a transmitting entity 905 as described with reference to FIGS. 1 and 10. Wireless device 1105 may include receiver 1110, transmitting entity beam refinement manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to transmitting beam refinement reference signals during a control symbol, etc.). Information may be passed on to other components of the device. The receiver 1110 may be an example of aspects of the transceiver 1335 described with reference to FIG. 13.

Transmitting entity beam refinement manager 1115 may be an example of aspects of the transmitting entity beam refinement manager 1315 described with reference to FIG. 13. Transmitting entity beam refinement manager 1115 may also include control information manager 1125 and BRRS manager 1130.

The transmitting entity beam refinement manager 1115 and/or at least some of its various sub-components may be implemented in hardware, software executed by a processor, firmware, or any combination thereof. If implemented in software executed by a processor, the functions of the transmitting entity beam refinement manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The transmitting entity beam refinement manager 1115 and/or at least some of its various sub-components may be physically located at various positions, including being distributed such that portions of functions are implemented at different physical locations by one or more physical devices. In some examples, transmitting entity beam refinement manager 1115 and/or at least some of its various sub-components may be a separate and distinct component in accordance with various aspects of the present disclosure. In other examples, transmitting entity beam refinement manager 1115 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Control information manager 1125 may generate, by a first network entity, control information associated with a second network entity, determine beam refinement reference signal configuration information indicating a configuration of the one or more beam refinement reference signals in the OFDM symbol, where the control information includes the beam refinement reference signal configuration information, transmit, by the first network entity, the control information using a first antenna port, and transmit, by the first network entity, the beam refinement reference signal using a second antenna port different from the first antenna port. In some cases, the first network entity includes a base station, and the second network entity includes a user equipment (UE). In some cases, the control information includes downlink control information, and the OFDM symbol includes a physical downlink control channel (PDCCH). In some cases, the first network entity includes a UE, and the second network entity includes a base station. In some cases, the control information includes uplink control information, and the OFDM symbol includes a physical uplink control channel (PUCCH).

BRRS manager 1130 may generate one or more beam refinement reference signals for transmission on a communication link between the first network entity and the second network entity, each beam refinement reference signal corresponding to a directional beam, transmit an orthogonal frequency division multiplexing (OFDM) symbol that includes the control information in a first frequency resource and includes the one or more beam refinement reference signals in a second frequency resource that is different from the first frequency resource, receive beam refinement feedback information including a beam index indicating a preferred beam refinement reference signal from the second network entity, generate the one or more beam refinement reference signals based on one or more digital directional beams associated with an analog directional beam of the communication link, and transmit a second OFDM symbol associated with a third network entity, where the second OFDM symbol includes second control information associated with the third network entity in a third frequency resource and a second beam refinement reference signal in a fourth frequency resource different from the third frequency resource. In some examples, the one or more beam refinement reference signals may be associated with a communication link between the first network entity and the second network entity. In some cases, a first subset of beam refinement reference signals corresponds to a first digital directional beam associated with an analog beam of the communication link. In some cases, a second subset of beam refinement reference signals corresponds to a second digital directional beam associated with the analog beam. In some cases, each of the beam refinement reference signals has the same energy per resource element (EPRE).

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
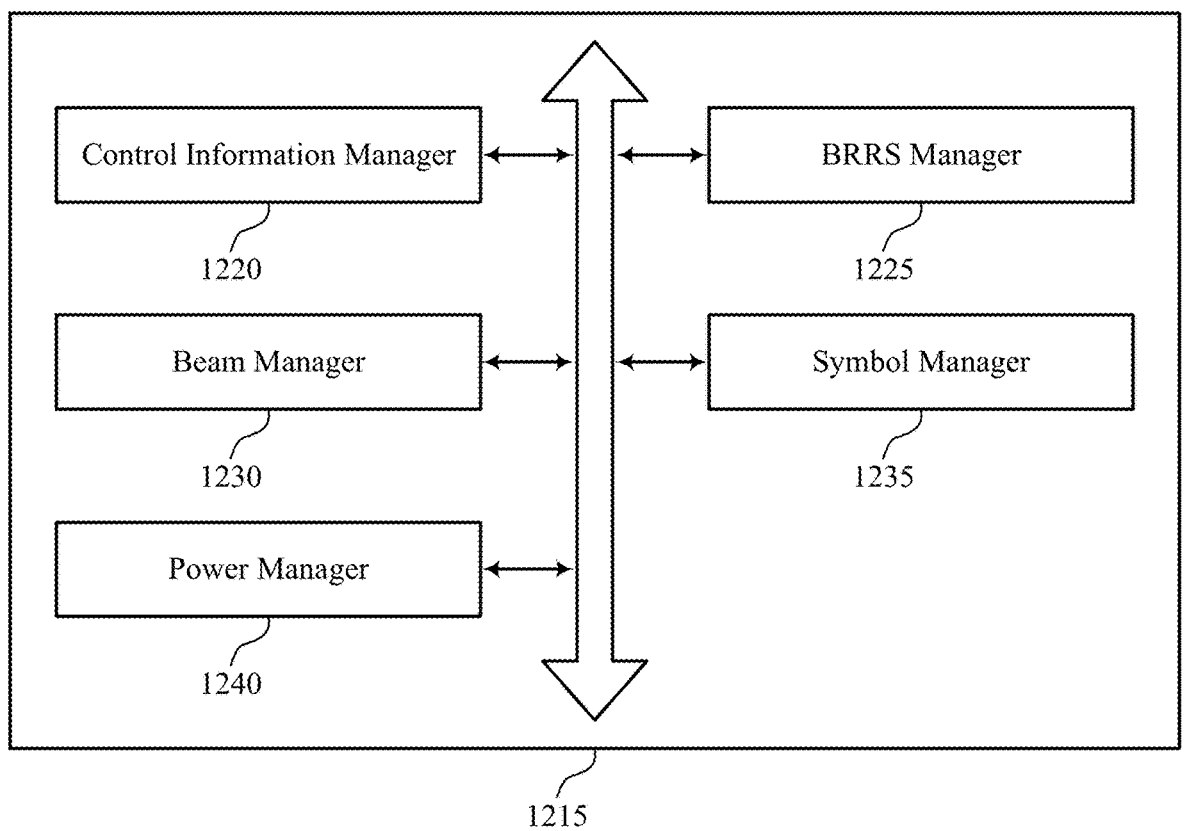

FIG. 12 shows a block diagram 1200 of a transmitting entity beam refinement manager 1215 that supports transmitting beam refinement reference signals during a control symbol in accordance with various aspects of the present disclosure. The transmitting entity beam refinement manager 1215 may be an example of aspects of a transmitting entity beam refinement manager 1015, a transmitting entity beam refinement manager 1115, or a transmitting entity beam refinement manager 1315 described with reference to FIGS. 10, 11, and 13. The transmitting entity beam refinement manager 1215 may include control information manager 1220, BRRS manager 1225, beam manager 1230, symbol manager 1235, and power manager 1240. Each of these modules may communicate, directly or indirectly, with one another (e.g., via one or more buses).

The transmitting entity beam refinement manager 1215 and/or at least some of its various sub-components may be implemented in hardware, software executed by a processor, firmware, or any combination thereof. If implemented in software executed by a processor, the functions of the transmitting entity beam refinement manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The transmitting entity beam refinement manager 1215 and/or at least some of its various sub-components may be physically located at various positions, including being distributed such that portions of functions are implemented at different physical locations by one or more physical devices. In some examples, transmitting entity beam refinement manager 1215 and/or at least some of its various sub-components may be a separate and distinct component in accordance with various aspects of the present disclosure. In other examples, transmitting entity beam refinement manager 1215 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Control information manager 1220 may generate, by a first network entity, control information associated with a second network entity, determine beam refinement reference signal configuration information indicating a configuration of the one or more beam refinement reference signals in the OFDM symbol, where the control information includes the beam refinement reference signal configuration information, transmit, by the first network entity, the control information using a first antenna port, and transmit, by the first network entity, the beam refinement reference signal using a second antenna port different from the first antenna port. In some cases, the first network entity includes a base station, and the second network entity includes a UE. In some cases, the control information includes downlink control information, and the OFDM symbol includes a PDCCH. In some cases, the first network entity includes a UE, and the second network entity includes a base station. In some cases, the control information includes uplink control information, and the OFDM symbol includes a PUCCH.

BRRS manager 1225 may generate one or more beam refinement reference signals for transmission on a communication link between the first network entity and the second network entity, each beam refinement reference signal corresponding to a directional beam, transmit an orthogonal frequency division multiplexing (OFDM) symbol that includes the control information in a first frequency resource and includes the one or more beam refinement reference signals in a second frequency resource that is different from the first frequency resource, receive beam refinement feedback information including a beam index indicating a preferred beam refinement reference signal from the second network entity, generate the one or more beam refinement reference signals based on one or more digital directional beams associated with an analog directional beam of the communication link, and transmit a second OFDM symbol associated with a third network entity, where the second OFDM symbol includes second control information associated with the third network entity in a third frequency resource and a second beam refinement reference signal in a fourth frequency resource different from the third frequency resource. In some examples, the one or more beam refinement reference signals may be associated with a communication link between the first network entity and the second network entity. In some cases, a first subset of beam refinement reference signals corresponds to a first digital directional beam associated with an analog beam of the communication link. In some cases, a second subset of beam refinement reference signals corresponds to a second digital directional beam associated with the analog beam. In some cases, each of the beam refinement reference signals has the same energy per resource element (EPRE).

Beam manager 1230 may adjust a characteristic of the directional beam corresponding to the preferred beam refinement reference signal based on the beam refinement feedback information and determine a beam characteristic for each of a set digital directional beams based on a beam characteristics of a prior digital directional beam associated with the first network entity and the second network entity.

Symbol manager 1235 may assign the one or more beam refinement reference signals to the second frequency resource of the OFDM symbol in a pattern.

Power manager 1240 may determine a total transmission power, determine a first transmission power for the control information based on the total transmission power and a first power parameter, determine a second transmission power for the one or more beam refinement reference signals based on a remaining transmission power associated with the total transmission power and the first transmission power and a second power parameter, where the transmitting of the OFDM symbol is based on the first transmission power and the second transmission power, and assign a total transmission power associated with the OFDM symbol between the control information and the one or more beam refinement reference signals.

Figure 13:
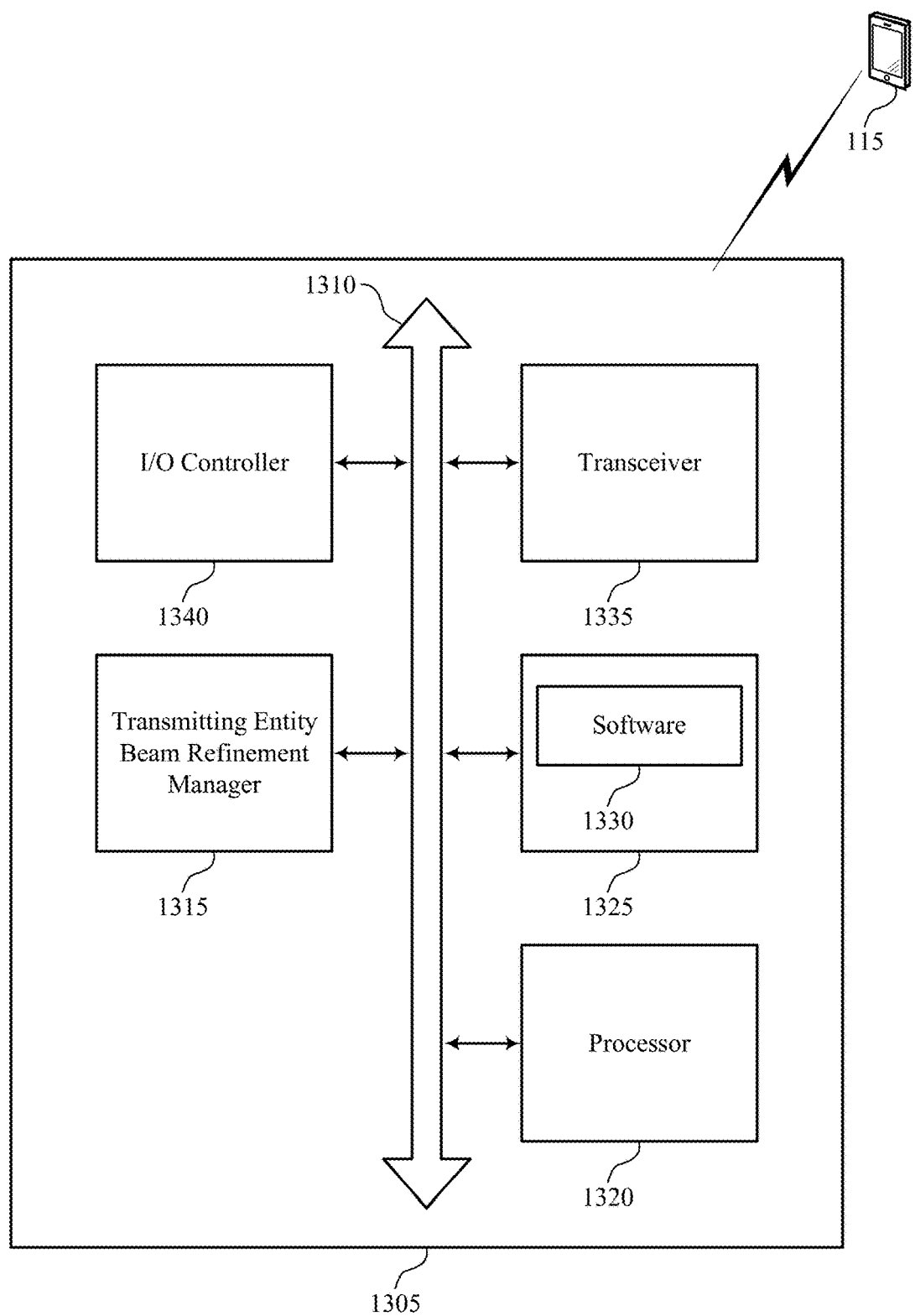
FIG. 13 illustrates a block diagram of a system including a transmitting entity that supports transmitting beam refinement reference signals during a control symbol in accordance with aspects of the present disclosure.

FIG. 13 shows a diagram of a system 1300 including a device 1305 that supports transmitting beam refinement reference signals during a control symbol in accordance with various aspects of the present disclosure. Device 1305 may be an example of or include the components of wireless device 1005, wireless device 1105, or a transmitting entity 905 as described above, e.g., with reference to FIGS. 1, 10 and 11. Device 1305 may include components for bi-directional voice and data communications including components for transmitting and receiving communications, including transmitting entity beam refinement manager 1315, processor 1320, memory 1325, software 1330, transceiver 1335, and I/O controller 1340. These components may be in electronic communication via one or more busses (e.g., bus 1310).

Processor 1320 may include an intelligent hardware device, (e.g., a general-purpose processor, a digital signal processor (DSP), a central processing unit (CPU), a microcontroller, an application-specific integrated circuit (ASIC), an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting transmitting beam refinement reference signals during a control symbol).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support transmitting beam refinement reference signals during a control symbol. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

I/O controller 1340 may manage input and output signals for device 1305. I/O controller 1340 may also manage peripherals not integrated into device 1305. In some cases, I/O controller 1340 may represent a physical connection or port to an external peripheral. In some cases, I/O controller 1340 may utilize an operating system such as iOS®, ANDROID®, MS-DOS®, MS-WINDOWS®, OS/2®, UNIX®, LINUX®, or another known operating system.

Figure 14:
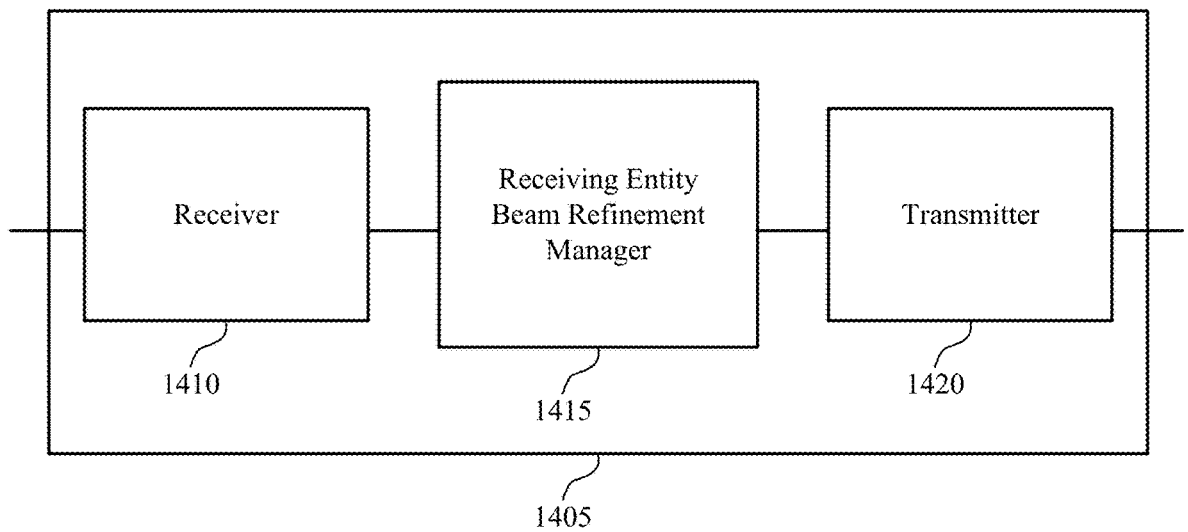
FIGS. 14 through 16 show block diagrams of a device that supports transmitting beam refinement reference signals during a control symbol in accordance with aspects of the present disclosure.

FIG. 14 shows a block diagram 1400 of a wireless device 1405 that supports transmitting beam refinement reference signals during a control symbol in accordance with various aspects of the present disclosure. Wireless device 1405 may be an example of aspects of a receiving entity 910 as described with reference to FIG. 1. Wireless device 1405 may include receiver 1410, receiving entity beam refinement manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to transmitting beam refinement reference signals during a control symbol, etc.). Information may be passed on to other components of the device. The receiver 1410 may be an example of aspects of the transceiver 1735 described with reference to FIG. 17.

Receiving entity beam refinement manager 1415 may be an example of aspects of the receiving entity beam refinement manager 1715 described with reference to FIG. 17. Receiving entity beam refinement manager 1415 may receive an orthogonal frequency division multiplexing (OFDM) symbol that includes control information in a first frequency resource and includes a set of beam refinement reference signals in a second frequency resource that is different from the first frequency resource, compare a characteristic of at least some of the set of beam refinement reference signals, and transmit beam refinement feedback information indicating a preferred beam refinement reference signal to a remote network entity based on the comparing.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas.

The receiving entity beam refinement manager 1415 may be implemented in hardware, software executed by a processor, firmware, or any combination thereof. If implemented in software executed by a processor, the functions of the receiving entity beam refinement manager 1415 may be executed by a general-purpose processor, a DSP, an ASIC, an FPGA or other programmable logic device, discrete gate or transistor logic, discrete hardware components, or any combination thereof designed to perform the functions described in the present disclosure. The receiving entity beam refinement manager 1415 may be physically located at various positions, including being distributed such that portions of functions are implemented at different physical locations by one or more physical devices. In some examples, receiving entity beam refinement manager 1415 may be a separate and distinct component in accordance with various aspects of the present disclosure. In other examples, receiving entity beam refinement manager 1415 may be combined with one or more other hardware components, including but not limited to a receiver, a transmitter, a transceiver, one or more other components described in the present disclosure, or a combination thereof in accordance with various aspects of the present disclosure.

Figure 15:
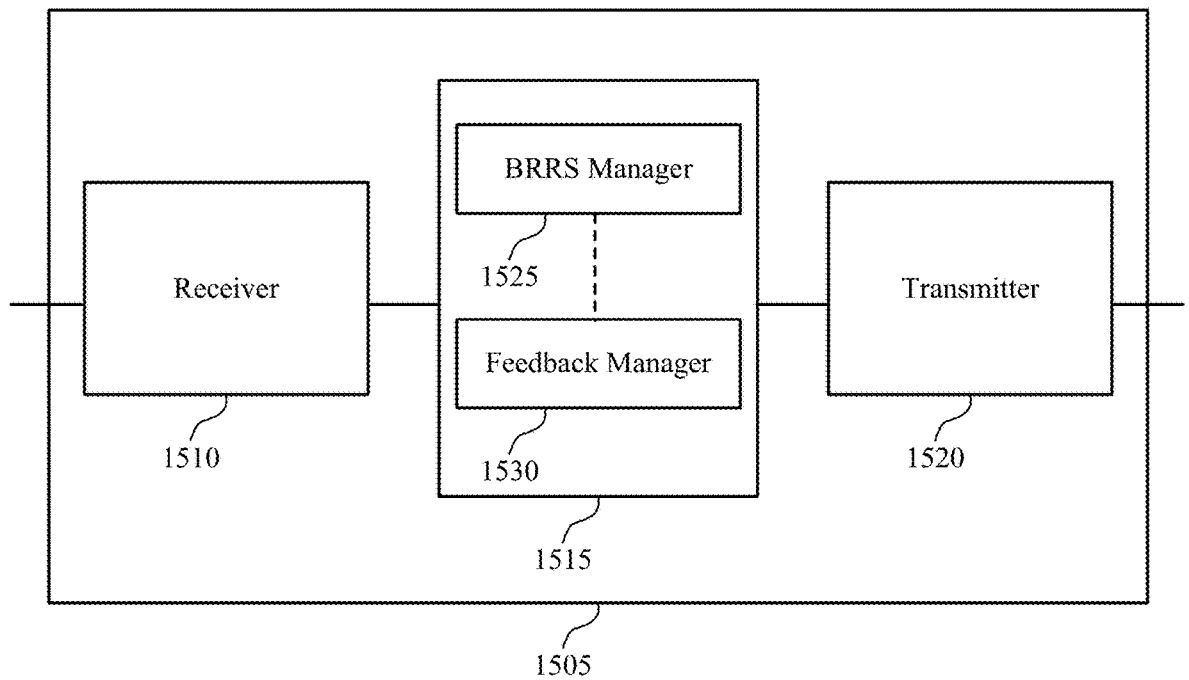

FIG. 15 shows a block diagram 1500 of a wireless device 1505 that supports transmitting beam refinement reference signals during a control symbol in accordance with various aspects of the present disclosure. Wireless device 1505 may be an example of aspects of a wireless device 1405 or a receiving entity 910 as described with reference to FIGS. 1 and 14. Wireless device 1505 may include receiver 1510, receiving entity beam refinement manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to transmitting beam refinement reference signals during a control symbol, etc.). Information may be passed on to other components of the device. The receiver 1510 may be an example of aspects of the transceiver 1735 described with reference to FIG. 17.

Receiving entity beam refinement manager 1515 may be an example of aspects of the receiving entity beam refinement manager 1715 described with reference to FIG. 17. Receiving entity beam refinement manager 1515 may also include BRRS manager 1525 and feedback manager 1530.

The receiving entity beam refinement manager 1515 and/or at least some of its various sub-components may be implemented in hardware, software executed by a processor, firmware, or any combination thereof. If implemented in software executed by a processor, the functions of the receiving entity beam refinement manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The receiving entity beam refinement manager 1515 and/or at least some of its various sub-components may be physically located at various positions, including being distributed such that portions of functions are implemented at different physical locations by one or more physical devices. In some examples, receiving entity beam refinement manager 1515 and/or at least some of its various sub-components may be a separate and distinct component in accordance with various aspects of the present disclosure. In other examples, receiving entity beam refinement manager 1515 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

BRRS manager 1525 may receive an orthogonal frequency division multiplexing (OFDM) symbol that includes control information in a first frequency resource and includes a set of beam refinement reference signals in a second frequency resource that is different from the first frequency resource, compare a characteristic of at least some of the set of beam refinement reference signals, and measure the characteristic of at least some of the set of beam refinement reference signals based on the control information, where comparing the characteristic of at least some of the set of beam refinement reference signals is based on the measuring. In some cases, the characteristic includes a received power level associated with the at least some of the set of beam refinement reference signals. In some cases, the set of beam refinement reference signals are transmitted via a set of digital directional beams generated from an analog directional beam, where the digital directional beams are narrower than the analog directional beam.

Feedback manager 1530 may transmit beam refinement feedback information indicating a preferred beam refinement reference signal to a remote network entity based on the comparing, identify the preferred beam refinement reference signal of the set of beam refinement reference signals based on the comparing, identify a beam index based on the comparing, and adjust the characteristic of a directional beam based on the preferred beam refinement reference signal.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
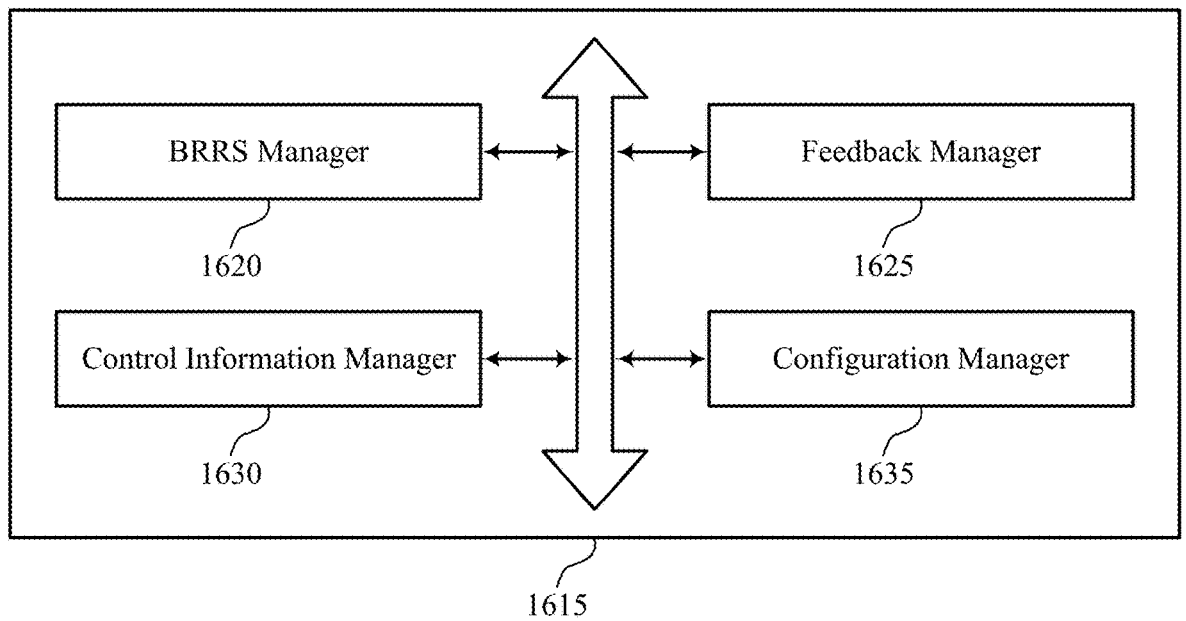

FIG. 16 shows a block diagram 1600 of a receiving entity beam refinement manager 1615 that supports transmitting beam refinement reference signals during a control symbol in accordance with various aspects of the present disclosure. The receiving entity beam refinement manager 1615 may be an example of aspects of a receiving entity beam refinement manager 1715 described with reference to FIGS. 14, 15, and 17. The receiving entity beam refinement manager 1615 may include BRRS manager 1620, feedback manager 1625, control information manager 1630, and configuration manager 1635. Each of these modules may communicate, directly or indirectly, with one another (e.g., via one or more buses).

The receiving entity beam refinement manager 1615 and/or at least some of its various sub-components may be implemented in hardware, software executed by a processor, firmware, or any combination thereof. If implemented in software executed by a processor, the functions of the receiving entity beam refinement manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The receiving entity beam refinement manager 1615 and/or at least some of its various sub-components may be physically located at various positions, including being distributed such that portions of functions are implemented at different physical locations by one or more physical devices. In some examples, receiving entity beam refinement manager 1615 and/or at least some of its various sub-components may be a separate and distinct component in accordance with various aspects of the present disclosure. In other examples, receiving entity beam refinement manager 1615 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

BRRS manager 1620 may receive an orthogonal frequency division multiplexing (OFDM) symbol that includes control information in a first frequency resource and includes a set of beam refinement reference signals in a second frequency resource that is different from the first frequency resource, compare a characteristic of at least some of the set of beam refinement reference signals, and measure the characteristic of at least some of the set of beam refinement reference signals based on the control information, where comparing the characteristic of at least some of the set of beam refinement reference signals is based on the measuring. In some cases, the characteristic includes a received power level associated with the at least some of the set of beam refinement reference signals. In some cases, the set of beam refinement reference signals are transmitted via a set of digital directional beams generated from an analog directional beam, where the digital directional beams are narrower than the analog directional beam.

Feedback manager 1625 may transmit beam refinement feedback information indicating a preferred beam refinement reference signal to a remote network entity based on the comparing, identify the preferred beam refinement reference signal of the set of beam refinement reference signals based on the comparing, identify a beam index based on the comparing, and adjust the characteristic of a directional beam based on the preferred beam refinement reference signal.

Control information manager 1630 may identify that the control information is associated with the set of beam refinement reference signals.

Configuration manager 1635 may identify a predetermined configuration based on identifying that the control information is associated with the set of beam refinement reference signals, where the comparing the characteristic is based on the identified predetermined configuration, determine beam refinement reference signal configuration information from the control information, the beam refinement reference signal configuration information including a frequency resource of the OFDM symbol having the set of beam refinement reference signals, a number of the set of the beam refinement reference signals, an interlace pattern of the set of the beam refinement reference signals, or combination thereof, where the comparing is based on the determining, determine beam refinement reference signal configuration information from the control information, and select a predetermined configuration from a set of predetermined configurations based on the beam refinement reference signal configuration information, where the comparing of the characteristic is based on the predetermined configuration.

Figure 17:
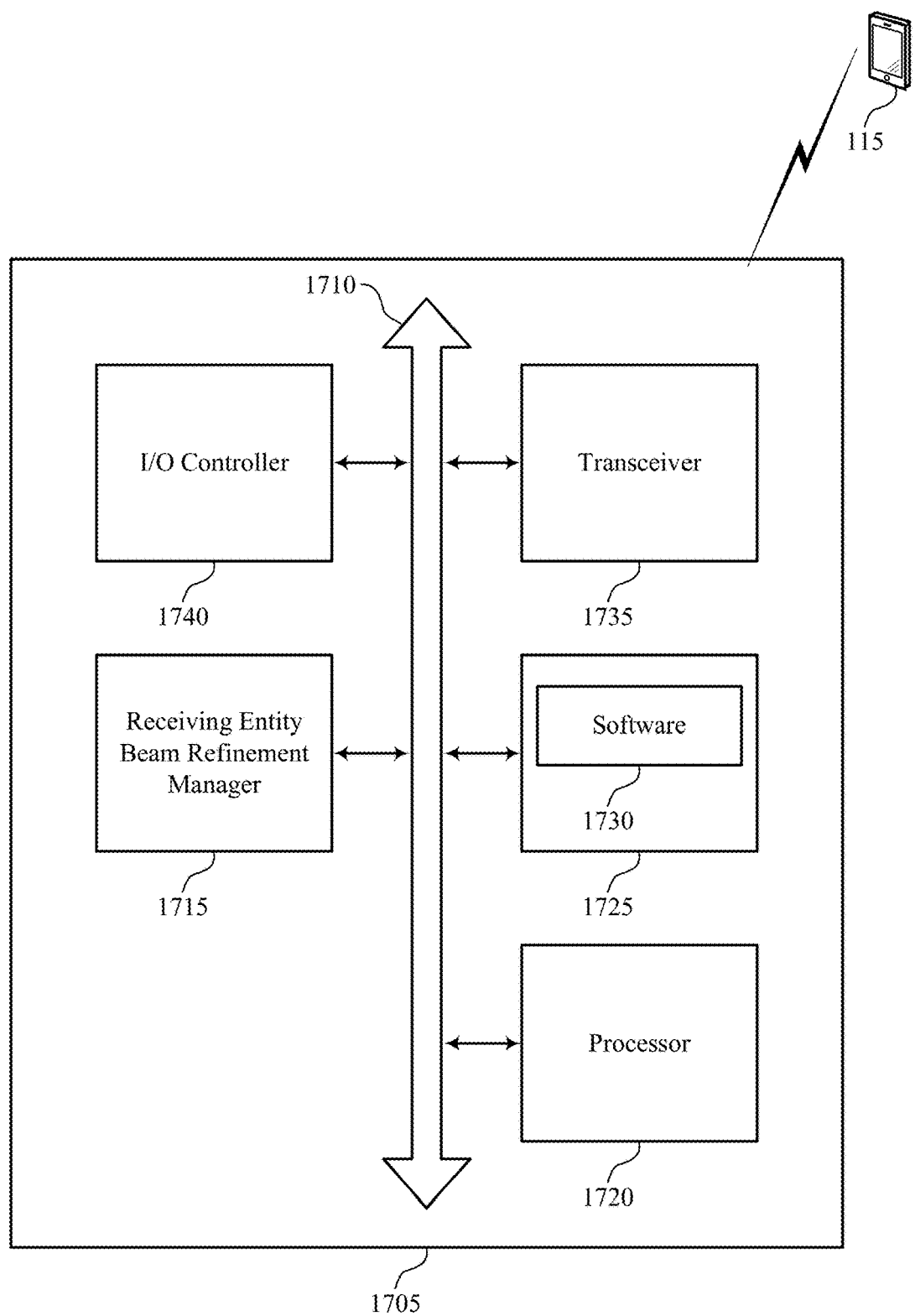
FIG. 17 illustrates a block diagram of a system including a receiving entity that supports transmitting beam refinement reference signals during a control symbol in accordance with aspects of the present disclosure.

FIG. 17 shows a diagram of a system 1700 including a device 1705 that supports transmitting beam refinement reference signals during a control symbol in accordance with various aspects of the present disclosure. Device 1705 may be an example of or include the components of receiving entity 910 as described above, e.g., with reference to FIG. 1. Device 1705 may include components for bi-directional voice and data communications including components for transmitting and receiving communications, including receiving entity beam refinement manager 1715, processor 1720, memory 1725, software 1730, transceiver 1735, and I/O controller 1740. These components may be in electronic communication via one or more busses (e.g., bus 1710).

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting transmitting beam refinement reference signals during a control symbol).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware and/or software operation such as the interaction with peripheral components or devices.

Software 1730 may include code to implement aspects of the present disclosure, including code to support transmitting beam refinement reference signals during a control symbol. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

I/O controller 1740 may manage input and output signals for device 1705. I/O controller 1740 may also manage peripherals not integrated into device 1705. In some cases, I/O controller 1740 may represent a physical connection or port to an external peripheral. In some cases, I/O controller 1740 may utilize an operating system such as iOS®, ANDROID®, MS-DOS®, MS-WINDOWS®, OS/2®, UNIX®, LINUX®, or another known operating system.

Figure 18:
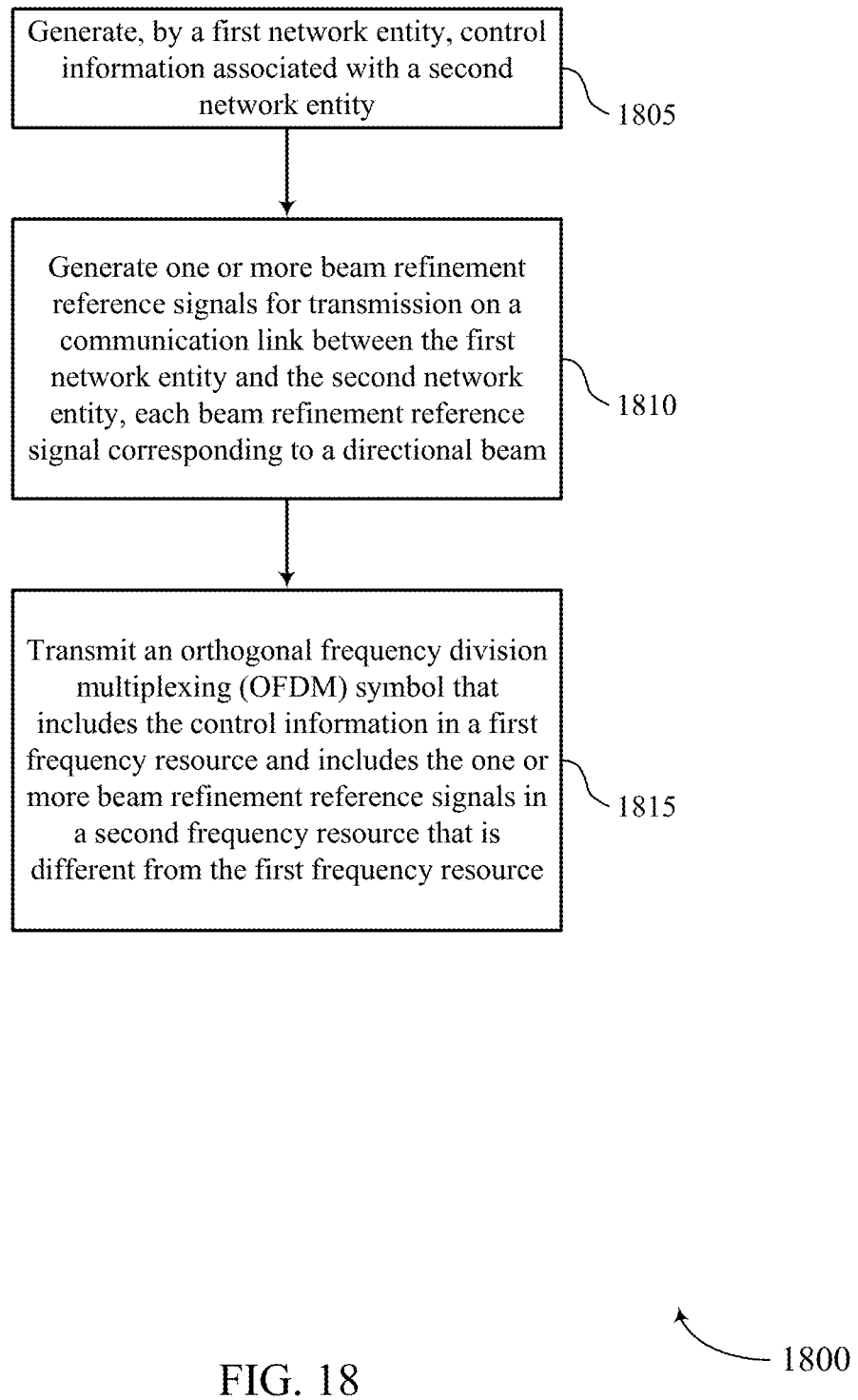
FIGS. 18 through 21 illustrate methods for transmitting beam refinement reference signals during a control symbol in accordance with aspects of the present disclosure.

FIG. 18 shows a flowchart illustrating a method 1800 for transmitting beam refinement reference signals during a control symbol in accordance with various aspects of the present disclosure. The operations of method 1800 may be implemented by a transmitting entity 905 or its components as described herein. For example, the operations of method 1800 may be performed by a transmitting entity beam refinement manager as described with reference to FIGS. 10 through 13. In some examples, a transmitting entity 905 may execute a set of codes to control the functional elements of the device to perform the functions described below. Additionally or alternatively, the transmitting entity 905 may perform aspects the functions described below using special-purpose hardware.

At block 1805 the transmitting entity 905 may generate, by a first network entity, control information associated with a second network entity. The operations of block 1805 may be performed according to the methods described with reference to FIGS. 1 through 9. In certain examples, aspects of the operations of block 1805 may be performed by a control information manager as described with reference to FIGS. 10 through 13.

At block 1810 the transmitting entity 905 may generate one or more beam refinement reference signals for transmission on a communication link between the first network entity and the second network entity, each beam refinement reference signal corresponding to a directional beam. In some examples, the one or more beam refinement reference signals may be associated with a communication link between the first network entity and the second network entity. The operations of block 1810 may be performed according to the methods described with reference to FIGS. 1 through 9. In certain examples, aspects of the operations of block 1810 may be performed by a BRRS manager as described with reference to FIGS. 10 through 13.

At block 1815 the transmitting entity 905 may transmit an orthogonal frequency division multiplexing (OFDM) symbol that includes the control information in a first frequency resource and includes the one or more beam refinement reference signals in a second frequency resource that is different from the first frequency resource. The operations of block 1815 may be performed according to the methods described with reference to FIGS. 1 through 9. In certain examples, aspects of the operations of block 1815 may be performed by a BRRS manager as described with reference to FIGS. 10 through 13.

Figure 19:
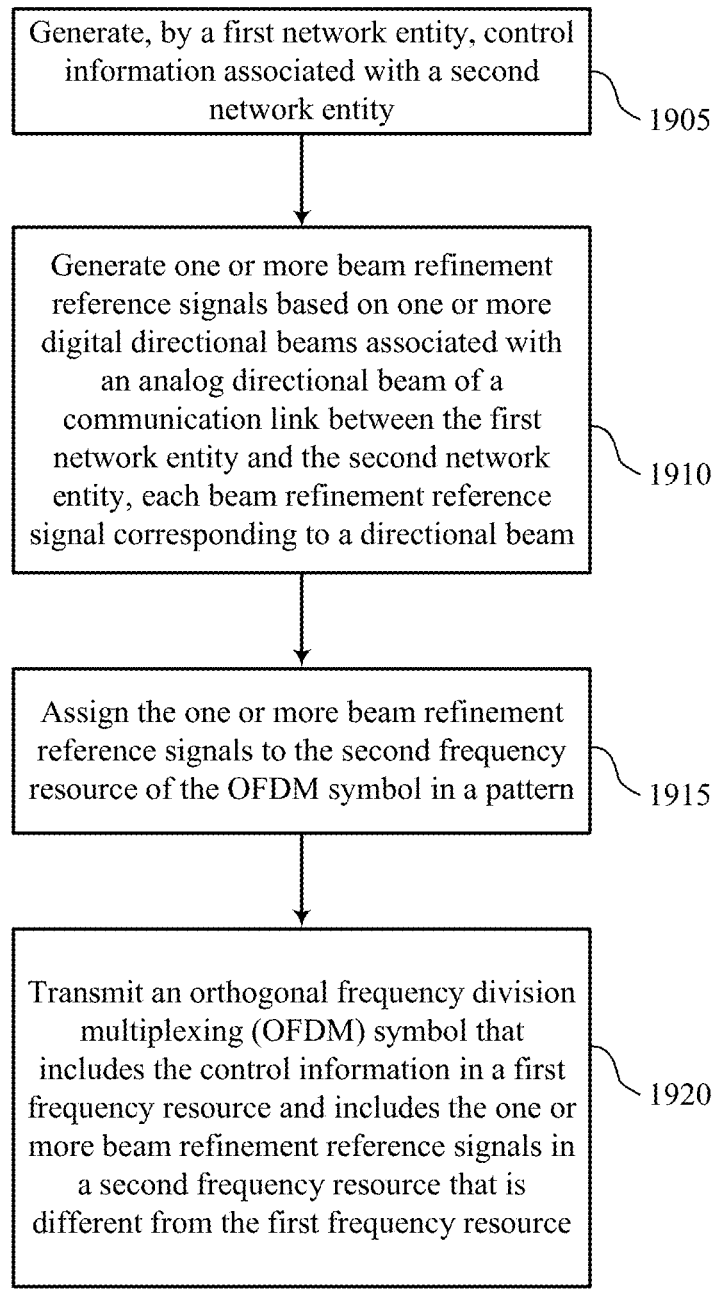

FIG. 19 shows a flowchart illustrating a method 1900 for transmitting beam refinement reference signals during a control symbol in accordance with various aspects of the present disclosure. The operations of method 1900 may be implemented by a transmitting entity 905 or its components as described herein. For example, the operations of method 1900 may be performed by a transmitting entity beam refinement manager as described with reference to FIGS. 10 through 13. In some examples, a transmitting entity 905 may execute a set of codes to control the functional elements of the device to perform the functions described below. Additionally or alternatively, the transmitting entity 905 may perform aspects the functions described below using special-purpose hardware.

At block 1905 the transmitting entity 905 may generate, by a first network entity, control information associated with a second network entity. The operations of block 1905 may be performed according to the methods described with reference to FIGS. 1 through 9. In certain examples, aspects of the operations of block 1905 may be performed by a control information manager as described with reference to FIGS. 10 through 13.

At block 1910 the transmitting entity 905 may generate one or more beam refinement reference signals based at least in part on one or more digital directional beams associated with an analog directional beam of a communication link between the first network entity and the second network entity, each beam refinement reference signal corresponding to a directional beam. The operations of block 1910 may be performed according to the methods described with reference to FIGS. 1 through 9. In certain examples, aspects of the operations of block 1910 may be performed by a BRRS manager as described with reference to FIGS. 10 through 13.

At block 1915 the transmitting entity 905 may assign the one or more beam refinement reference signals to the second frequency resource of the OFDM symbol in a pattern. The operations of block 1915 may be performed according to the methods described with reference to FIGS. 1 through 9. In certain examples, aspects of the operations of block 1915 may be performed by a symbol manager as described with reference to FIGS. 10 through 13.

At block 1920 the transmitting entity 905 may transmit an orthogonal frequency division multiplexing (OFDM) symbol that includes the control information in a first frequency resource and includes the one or more beam refinement reference signals in a second frequency resource that is different from the first frequency resource. The operations of block 1920 may be performed according to the methods described with reference to FIGS. 1 through 9. In certain examples, aspects of the operations of block 1920 may be performed by a BRRS manager as described with reference to FIGS. 10 through 13.

Figure 20:
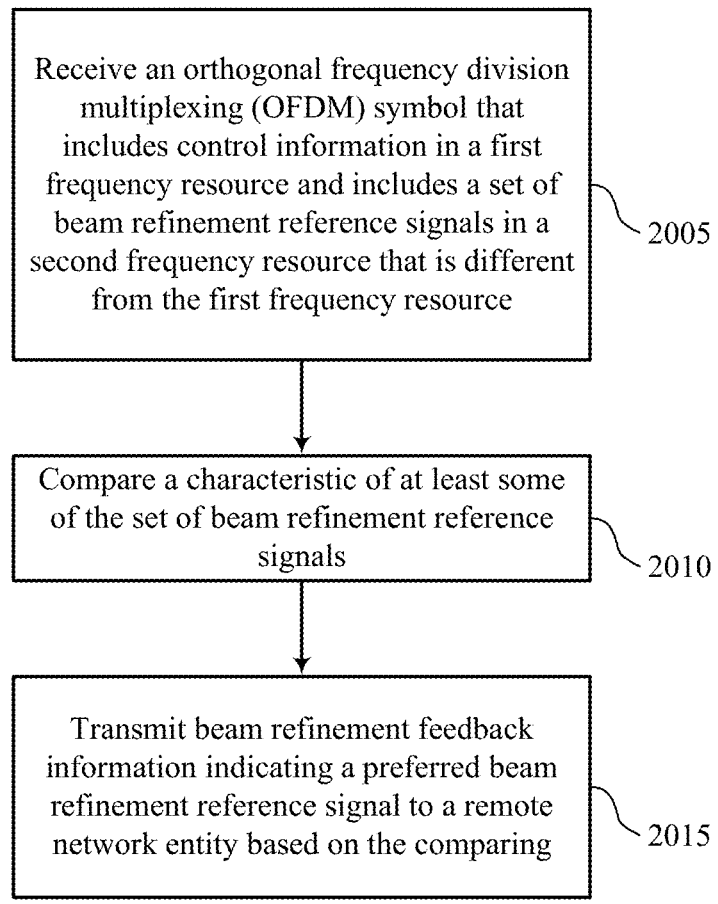

FIG. 20 shows a flowchart illustrating a method 2000 for transmitting beam refinement reference signals during a control symbol in accordance with various aspects of the present disclosure. The operations of method 2000 may be implemented by a receiving entity 910 or its components as described herein. For example, the operations of method 2000 may be performed by a receiving entity beam refinement manager as described with reference to FIGS. 14 through 17. In some examples, a receiving entity 910 may execute a set of codes to control the functional elements of the device to perform the functions described below. Additionally or alternatively, the receiving entity 910 may perform aspects the functions described below using special-purpose hardware.

At block 2005 the receiving entity 910 may receive an orthogonal frequency division multiplexing (OFDM) symbol that includes control information in a first frequency resource and includes a plurality of beam refinement reference signals in a second frequency resource that is different from the first frequency resource. The operations of block 2005 may be performed according to the methods described with reference to FIGS. 1 through 9. In certain examples, aspects of the operations of block 2005 may be performed by a BRRS manager as described with reference to FIGS. 14 through 17.

At block 2010 the receiving entity 910 may compare a characteristic of at least some of the plurality of beam refinement reference signals. The operations of block 2010 may be performed according to the methods described with reference to FIGS. 1 through 9. In certain examples, aspects of the operations of block 2010 may be performed by a BRRS manager as described with reference to FIGS. 14 through 17.

At block 2015 the receiving entity 910 may transmit beam refinement feedback information indicating a preferred beam refinement reference signal to a remote network entity based at least in part on the comparing. The operations of block 2015 may be performed according to the methods described with reference to FIGS. 1 through 9. In certain examples, aspects of the operations of block 2015 may be performed by a feedback manager as described with reference to FIGS. 14 through 17.

Figure 21:
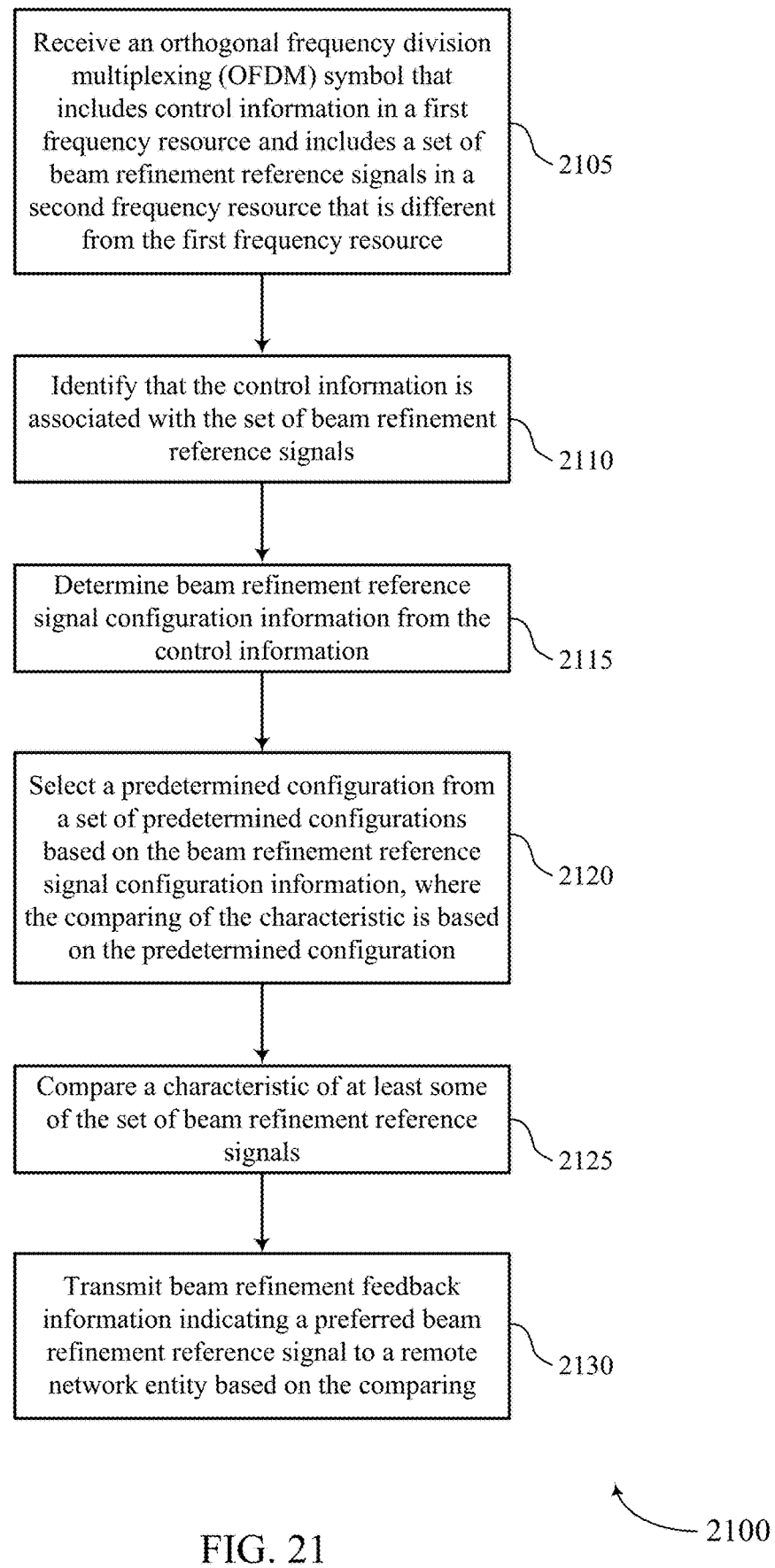

FIG. 21 shows a flowchart illustrating a method 2100 for transmitting beam refinement reference signals during a control symbol in accordance with various aspects of the present disclosure. The operations of method 2100 may be implemented by a receiving entity 910 or its components as described herein. For example, the operations of method 2100 may be performed by a receiving entity beam refinement manager as described with reference to FIGS. 14 through 17. In some examples, a receiving entity 910 may execute a set of codes to control the functional elements of the device to perform the functions described below. Additionally or alternatively, the receiving entity 910 may perform aspects the functions described below using special-purpose hardware.

At block 2105 the receiving entity 910 may receive an orthogonal frequency division multiplexing (OFDM) symbol that includes control information in a first frequency resource and includes a plurality of beam refinement reference signals in a second frequency resource that is different from the first frequency resource. The operations of block 2105 may be performed according to the methods described with reference to FIGS. 1 through 9. In certain examples, aspects of the operations of block 2105 may be performed by a BRRS manager as described with reference to FIGS. 14 through 17.

At block 2110 the receiving entity 910 may identify that the control information is associated with the plurality of beam refinement reference signals. The operations of block 2110 may be performed according to the methods described with reference to FIGS. 1 through 9. In certain examples, aspects of the operations of block 2110 may be performed by a control information manager as described with reference to FIGS. 14 through 17.

At block 2115 the receiving entity 910 may determine beam refinement reference signal configuration information from the control information. The operations of block 2115 may be performed according to the methods described with reference to FIGS. 1 through 9. In certain examples, aspects of the operations of block 2115 may be performed by a configuration manager as described with reference to FIGS. 14 through 17.

At block 2120 the receiving entity 910 may select a predetermined configuration from a set of predetermined configurations based at least in part on the beam refinement reference signal configuration information, wherein the comparing of the characteristic is based at least in part on the predetermined configuration. The operations of block 2120 may be performed according to the methods described with reference to FIGS. 1 through 9. In certain examples, aspects of the operations of block 2120 may be performed by a configuration manager as described with reference to FIGS. 14 through 17.

At block 2125 the receiving entity 910 may compare a characteristic of at least some of the plurality of beam refinement reference signals. The operations of block 2125 may be performed according to the methods described with reference to FIGS. 1 through 9. In certain examples, aspects of the operations of block 2125 may be performed by a BRRS manager as described with reference to FIGS. 14 through 17.

At block 2130 the receiving entity 910 may transmit beam refinement feedback information indicating a preferred beam refinement reference signal to a remote network entity based at least in part on the comparing. The operations of block 2130 may be performed according to the methods described with reference to FIGS. 1 through 9. In certain examples, aspects of the operations of block 2130 may be performed by a feedback manager as described with reference to FIGS. 14 through 17.

In some examples, aspects two or more of the methods 1800, 1900, 2000, and 2100 described with reference to FIGS. 18, 19, 20, and 21 may be combined. It should be noted that the methods 1800, 1900, 2000, and 2100 are just example implementations, and that the operations of the methods 1800, 1900, 2000, and 2100 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS).

3GPP Long Term Evolution and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
generating, by a first network entity, control information associated with a second network entity;
generating a plurality of beam refinement reference signals for transmission on a communication link between the first network entity and the second network entity, each beam refinement reference signal of the plurality of beam refinement reference signals corresponding to a different directional beam; and
transmitting an orthogonal frequency division multiplexing (OFDM) symbol that includes the control information in a first set of frequency resources of the OFDM symbol and includes at least a first one of the plurality of beam refinement reference signals in a first subset of a second set of frequency resources of the OFDM symbol and includes at least a second one of the plurality of beam refinement reference signals in a second subset of the second set of frequency resources of the OFDM symbol, wherein the OFDM symbol comprises a control channel for communicating with at least the second network entity.

2. The method of claim 1, further comprising:
receiving beam refinement feedback information including a beam index indicating a preferred beam refinement reference signal from the second network entity.

3. The method of claim 2, further comprising:
adjusting a characteristic of a directional beam corresponding to the preferred beam refinement reference signal based at least in part on the beam refinement feedback information.

4. The method of claim 1, further comprising:
generating the plurality of beam refinement reference signals based at least in part on one or more digital directional beams associated with an analog directional beam of the communication link.

5. The method of claim 1, further comprising:
assigning ones of the plurality of beam refinement reference signals to the first subset or the second subset of the second set of frequency resources of the OFDM symbol in a pattern.

6. The method of claim 1, wherein:
a first subset of beam refinement reference signals of the plurality of beam refinement reference signals corresponds to a first digital directional beam associated with an analog beam of the communication link; and
a second subset of beam refinement reference signals of the plurality of beam refinement reference signals corresponds to a second digital directional beam associated with the analog beam.

7. The method of claim 1, wherein:
each beam refinement reference signal of the plurality of beam refinement reference signals has the same energy per resource element (EPRE).

8. The method of claim 1, further comprising:
determining beam refinement reference signal configuration information indicating a configuration of the plurality of beam refinement reference signals in the OFDM symbol, wherein the control information includes the beam refinement reference signal configuration information.

9. The method of claim 1, further comprising:
determining a total transmission power;

determining a first transmission power for the control information based at least in part on the total transmission power and a first power parameter; and determining a second transmission power for the plurality of beam refinement reference signals based at least in part on a remaining transmission power associated with the total transmission power and the first transmission power and a second power parameter, wherein the transmitting of the OFDM symbol is based at least in part on the first transmission power and the second transmission power.

10. The method of claim 1, further comprising:

assigning a total transmission power associated with the OFDM symbol between the control information and the plurality of beam refinement reference signals.

11. The method of claim 1, further comprising:

transmitting a second OFDM symbol associated with a third network entity, wherein the second OFDM symbol includes second control information associated with the third network entity in a first subset of a third set of frequency resources and a second beam refinement reference signal in a second subset of a fourth set of frequency resources different from the third set of frequency resources.

12. The method of claim 1, wherein:

the first network entity comprises a base station, the second network entity comprises a user equipment (UE) the control information comprises downlink control information, and the control channel comprises a physical downlink control channel (PDCCH).

13. The method of claim 1, wherein:

the first network entity comprises a user equipment (UE), the second network entity comprises a base station, the control information comprises uplink control information, and the control channel comprises a physical uplink control channel (PUCCH).

14. The method of claim 13, further comprising:

transmitting, by the first network entity, the control information using a first antenna port; and transmitting, by the first network entity, the first one of the plurality of beam refinement reference signals and the second one of the plurality of beam refinement reference signals using a second antenna port different from the first antenna port.

15. The method of claim 1, further comprising:

determining a beam characteristic for each of a plurality digital directional beams based at least in part on a beam characteristics of a prior digital directional beam associated with the first network entity and the second network entity.

16. A method for wireless communication, comprising:

receiving an orthogonal frequency division multiplexing (OFDM) symbol that includes control information in a first set of frequency resources of the OFDM symbol and includes at least a first one of a plurality of beam refinement reference signals in a first subset of a second set of frequency resources of the OFDM symbol and includes at least a second one of the plurality of beam refinement reference signals in a second subset of the second set of frequency resources of the OFDM symbol, wherein the OFDM symbol comprises a control channel for communicating with a remote network entity, wherein the first one of the plurality of beam refinement reference signals and the second one of the plurality of beam refinement reference signals correspond to different directional beams;

comparing a characteristic of at least some of the beam refinement reference signals of the plurality of beam refinement reference signals; and transmitting beam refinement feedback information indicating a preferred beam refinement reference signal to the remote network entity based at least in part on the comparing.

17. The method of claim 16, wherein:

the characteristic comprises a received power level associated with the at least some of the plurality of beam refinement reference signals.

18. The method of claim 16, further comprising:

identifying the preferred beam refinement reference signal of the plurality of beam refinement reference signals based at least in part on the comparing.

19. The method of claim 16, further comprising:

identifying that the control information is associated with the plurality of beam refinement reference signals; and identifying a predetermined configuration based at least in part on identifying that the control information is associated with the plurality of beam refinement reference signals, wherein the comparing the characteristic is based at least in part on the identified predetermined configuration.

20. The method of claim 16, further comprising:

determining beam refinement reference signal configuration information from the control information, the beam refinement reference signal configuration information comprising the second set of frequency resources of the OFDM symbol having the plurality of beam refinement reference signals, a number of beam refinement reference signals of the plurality of beam refinement reference signals, an interlace pattern of the plurality of beam refinement reference signals, or combination thereof, wherein the comparing is based at least in part on the determining.

21. The method of claim 16, further comprising:

determining beam refinement reference signal configuration information from the control information; and selecting a predetermined configuration from a set of predetermined configurations based at least in part on the beam refinement reference signal configuration information, wherein the comparing of the characteristic is based at least in part on the predetermined configuration.

22. The method of claim 16, further comprising:

identifying a beam index based at least in part on the comparing.

23. The method of claim 16, further comprising:

measuring the characteristic of at least some of the plurality of beam refinement reference signals based at least in part on the control information, wherein comparing the characteristic of at least some of the plurality of beam refinement reference signals is based at least in part on the measuring.

24. The method of claim 16, wherein:

the plurality of beam refinement reference signals are transmitted via a plurality of digital directional beams generated from an analog directional beam, wherein the digital directional beams are narrower than the analog directional beam.

25. The method of claim 16, further comprising:

adjusting the characteristic of a directional beam based at least in part on the preferred beam refinement reference signal.

26. An apparatus for wireless communication, comprising:

a processor;

memory coupled with the processor; and instructions stored in the memory and operable, when executed by the processor, to cause the apparatus to:

generate a plurality of beam refinement reference signals for transmission on a communication link between a first network entity and a second network entity, each beam refinement reference signal of the plurality of beam refinement reference signals corresponding to a different directional beam; and transmit an orthogonal frequency division multiplexing (OFDM) symbol that includes control information in a first set of frequency resources of the OFDM symbol and includes at least a first one of the plurality of beam refinement reference signals in a first subset of a second set of frequency resources of the OFDM symbol and includes at least a second one of the plurality of beam refinement reference signals in a second subset of the second set of frequency resources of the OFDM symbol, wherein the OFDM symbol comprises a control channel for communicating with at least the second network entity.

27. The apparatus of claim 26, wherein the instructions are further executable by the processor to:

receive beam refinement feedback information including a beam index indicating a preferred beam refinement reference signal from the second network entity.

28. The apparatus of claim 27, wherein the instructions are further executable by the processor to:

adjust a characteristic of a directional beam corresponding to the preferred beam refinement reference signal based at least in part on the beam refinement feedback information.

29. An apparatus for wireless communication, in a system comprising:

a processor;

memory coupled with the processor; and instructions stored in the memory and operable, when executed by the processor, to cause the apparatus to:

receive an orthogonal frequency division multiplexing (OFDM) symbol that includes control information in a first set of frequency resources of the OFDM symbol and includes at least a first one of a plurality of beam refinement reference signals in a first subset of a second set of frequency resources of the OFDM symbol and at least a second one of the plurality of beam refinement reference signals in a second subset of the second set of frequency resources of the OFDM symbol, wherein the OFDM symbol comprises a control channel for communicating with a remote network entity, wherein the first one of the plurality of beam refinement reference signals and the second one of the plurality of beam refinement reference signals correspond to different directional beams;

compare a characteristic of at least some of the beam refinement reference signals of the plurality of beam refinement reference signals; and transmit beam refinement feedback information indicating a preferred beam refinement reference signal to the remote network entity based at least in part on the comparing.

30. The apparatus of claim 29, wherein:

the characteristic comprises a received power level associated with the at least some of the plurality of beam refinement reference signals.

* * * * *